United States Patent
Hirao

(10) Patent No.: US 8,384,296 B2
(45) Date of Patent: Feb. 26, 2013

(54) HIGH PRESSURE DISCHARGE LAMP LIGHTING APPARATUS AND PROJECTOR

(75) Inventor: Tetsuji Hirao, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 386 days.

(21) Appl. No.: 12/805,519

(22) Filed: Aug. 4, 2010

(65) Prior Publication Data

US 2011/0043771 A1    Feb. 24, 2011

(30) Foreign Application Priority Data

Aug. 19, 2009 (JP) .................................. 2009-190231

(51) Int. Cl.
*H05B 41/36*    (2006.01)
*G05F 1/00*    (2006.01)

(52) U.S. Cl. ...................................... 315/224; 315/291

(58) Field of Classification Search ............... 315/209 R, 315/291, 307, 224, 308, 360; 250/205, 386, 250/387

See application file for complete search history.

(56) References Cited

U.S. PATENT DOCUMENTS

| | | | |
|---|---|---|---|
| 5,109,181 A | 4/1992 | Fischer et al. | |
| 6,545,430 B2 | 4/2003 | Ono et al. | |
| 7,208,882 B2 * | 4/2007 | Ishizuka | 315/225 |
| 7,327,095 B2 * | 2/2008 | Urakabe et al. | 315/291 |
| 7,358,686 B2 | 4/2008 | Deurloo | |
| 7,508,144 B2 * | 3/2009 | Yamauchi et al. | 315/291 |
| 7,560,873 B2 * | 7/2009 | Feldtkeller et al. | 315/224 |
| 2009/0051300 A1 | 2/2009 | Deppe et al. | |

FOREIGN PATENT DOCUMENTS

| | | |
|---|---|---|
| JP | 2000-131668 A | 5/2000 |
| JP | 2003-330115 A | 11/2003 |
| JP | 2004-151489 A | 5/2004 |
| JP | 2005-235445 A | 9/2005 |
| JP | 2006-332015 A | 12/2006 |
| JP | 2009-527871 A | 7/2009 |

\* cited by examiner

*Primary Examiner* — Minh D A
(74) *Attorney, Agent, or Firm* — Radar, Fishman & Grauer PLLC

(57) ABSTRACT

A high pressure discharge lamp lighting apparatus that comprises a power supply apparatus that supplies a rectangle wave alternating current to the high pressure discharge lamp for lighting, such that when the lamp is operated by electric power of $0.5 \times P$ (W) or less, when maximum operation power P (W) in a steady lighting state except an initial lighting period that is immediately after starting, where a first polarity driving period of a rectangle wave alternating current is Ta (seconds), and where a second polarity driving period is Tb (seconds) an operation is performed so that the second polarity driving period Tb is 5 ms or less (Tb≦5 ms) and a ratio Tb/Ta of these two driving periods is 0.1 or less (Tb/Ta≦0.1).

10 Claims, 16 Drawing Sheets

FIG. 1
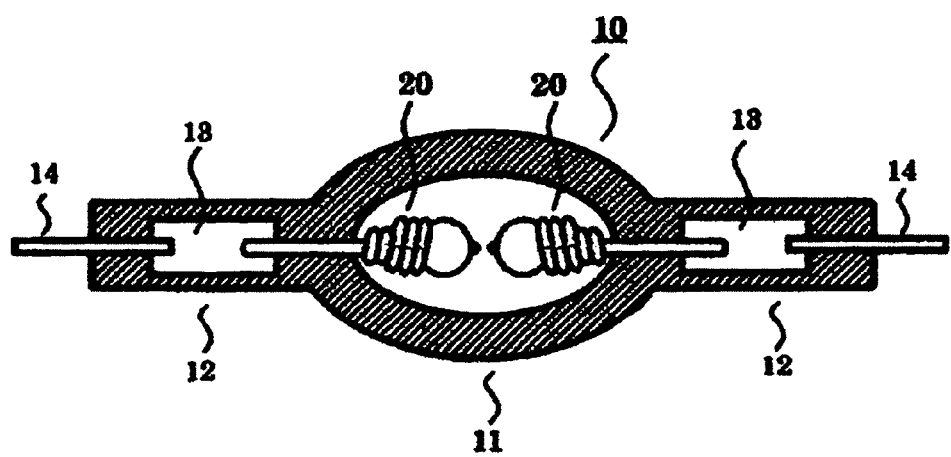
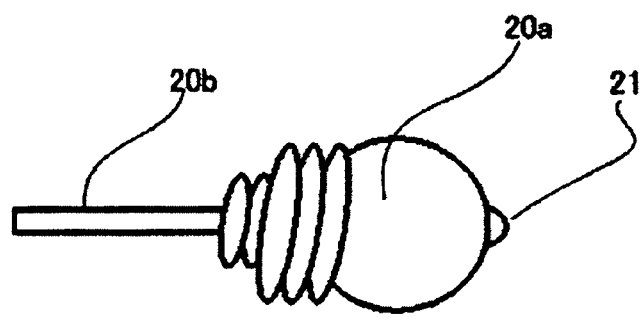
FIG. 2

FIG. 3
FIG. 3A
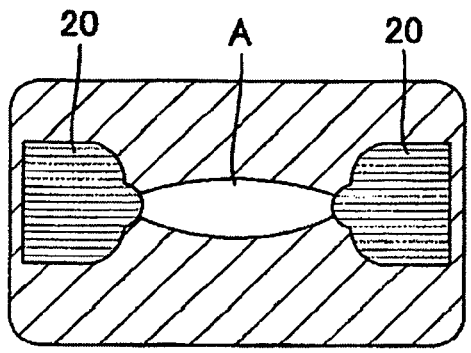
FIG. 3B
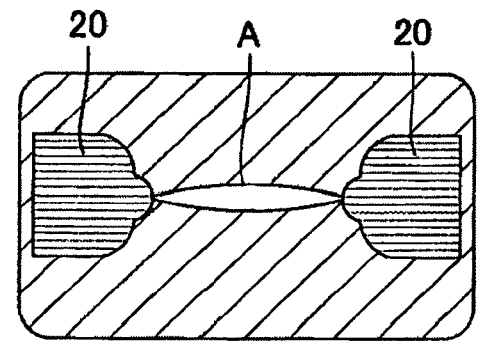
FIG. 3C
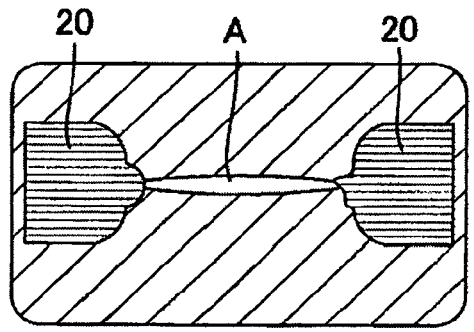
FIG. 3D
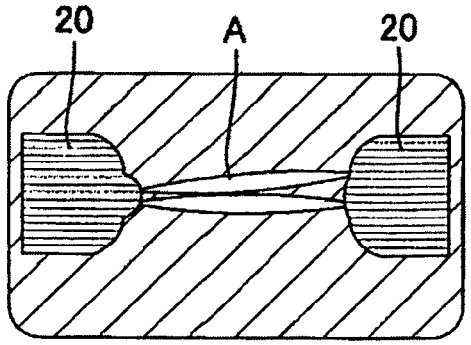

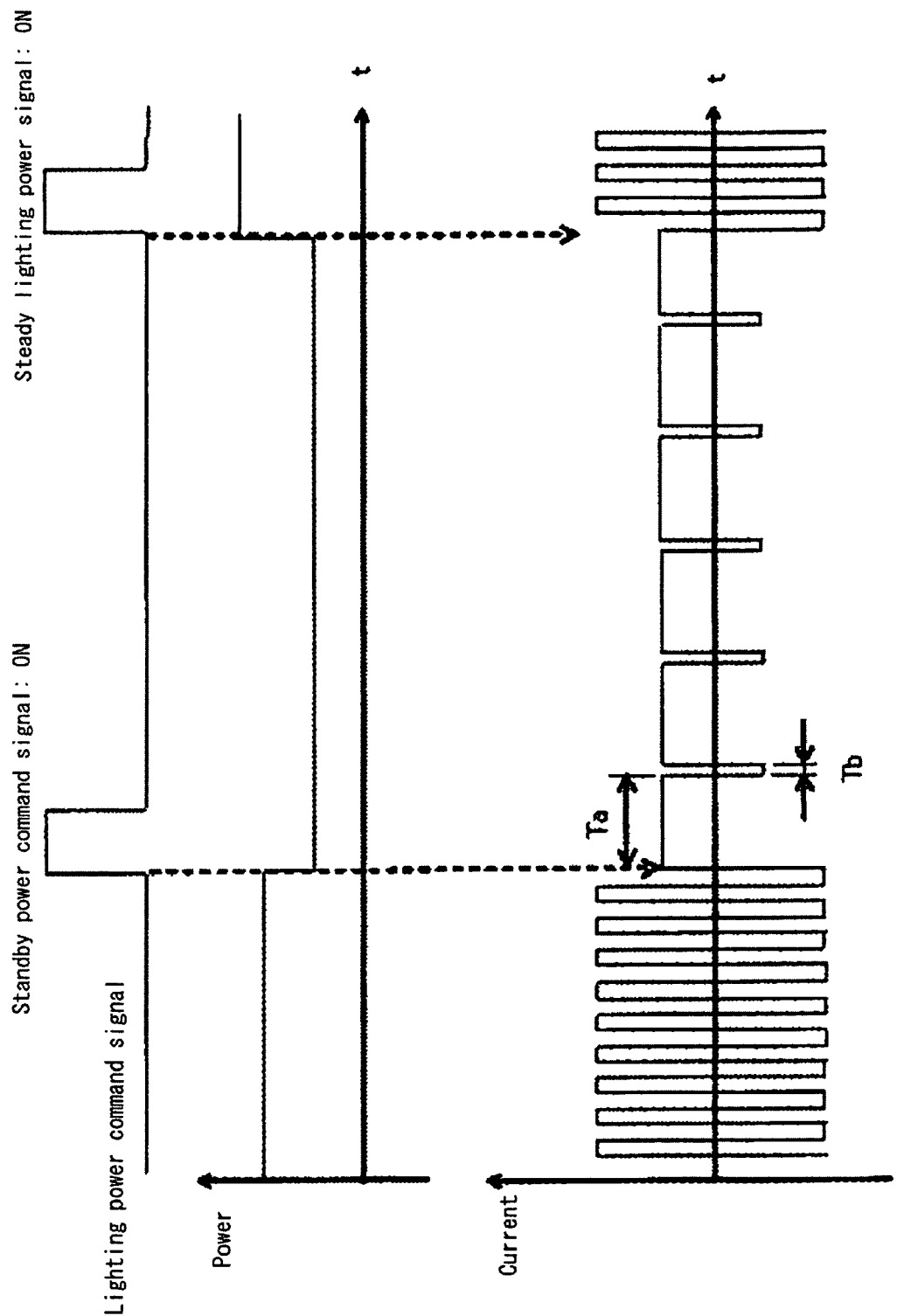
F I G. 8

HIGH PRESSURE DISCHARGE LAMP LIGHTING APPARATUS AND PROJECTOR

CROSS-REFERENCES TO RELATED APPLICATION

This application claims priority from Japanese Patent Application Serial No. 2009-190231 filed Aug. 19, 2009, the contents of which are incorporated herein by reference in its entirety.

TECHNICAL FIELD

The present invention relates to a high pressure discharge lamp lighting apparatus and a projector that mounts such a high pressure discharge lamp lighting apparatus. Especially, the present invention relates to a high pressure discharge lamp lighting apparatus comprising an alternating current lighting type high pressure discharge lamp, in which an arc tube encloses 0.2 mg/mm$^3$ or more of mercury at a high vapor pressure during lighting, for example, 110 or more atmospheric pressure, and that is suitably used as a light source for a projection type projector apparatus or a rear projection television. And a lighting apparatus thereof, further relates to a projector in which the above high pressure discharge lamp is mounted.

BACKGROUND

For example, in such a projection type projector apparatus, an image with uniform and sufficient color rendering properties is required to be projected onto a rectangle screen. For this reason, a metal halide lamp that encloses mercury and metal halide, is used as a light source. Moreover, in recent years, more miniaturization and development of a point light source are advanced, so that a lamp having a very short distance between electrodes has been put in practical use. In such a situation, a high pressure discharge lamp with very high mercury vapor pressure, for example, 20 MPa (approximately 197 atmospheric pressure) or more, has been recently used, instead of such a metal halide lamp. This lamp is designed to reduce arc spread, and to further improve an optical output by increasing the mercury vapor pressure.

For example, a high pressure discharge lamp in which a pair of electrodes is arranged in an arc tube made of silica glass, so as to face each other at an interval of 2 mm or less, and in which mercury of 0.20 mg/mm$^3$ or more, rare gas, and halogen in a range of 10-6 µmol/mm$^3$ to 10-2 µmol/mm$^3$, are enclosed in the arc tube (for example, refer to Japanese Patent Application Serial No. H02-148561). For example, Japanese Patent Application Serial No. 2001-312997 teaches this kind of discharge lamp and a lighting apparatus. Japanese Patent Application Serial No. 2000-131668 teaches a high pressure discharge lamp in which the inside arc tube mercury vapor pressure at time of steady lighting is 15 MPa-35 MPa, and a halogen substance in a range of 10-6 µmol/mm$^3$ to 10-2 µmol/mm$^3$ is enclosed in the arc tube. Also, a pair of electrodes is provided in the arc tube and a projection portion is formed around the center of the tips of the electrodes to prevent an arc jump phenomenon, which is when the position of an electric discharge arc generated between the electrodes is not stabilized and moves between the central part or the circumference part of the tips of the electrodes. Further, alternating current voltage is impressed between the pair of electrodes so as to turn on the lamp, by a lighting apparatus, which is made up of a DC/DC converter, a DC/AC inverter, and a high pressure voltage generating apparatus.

On the other hand, since projectors are getting miniaturized in recent years and are standard in homes, it is necessary to consider a screen that does not become too bright in relation to the environment's brightness and a projected image. A projector that has a modulated light function was invented in order to meet such demands (for example, Japanese Patent Application Serial No. 2000-131668). Here, in the modulated light function, the brightness of a high pressure discharge lamp is adjusted so that power consumption is reduced to a low level by lighting the lamp with electric power lower than the rated power. Hereinafter, lamp lighting with electric power lower than the rated power is referred to as "modulated light power lighting." In general, existing high pressure discharge lamp lighting apparatuses are equipped with both "rated power lighting" and "modulated light power lighting." In the present specification, the lighting including the "rated power lighting" and the "modulated light power lighting" is defined as steady lighting. Moreover, the "modulated light power lighting" is in general operated with 60-80% of electric power in the "rated power lighting."

FIG. 17 shows an example of a waveform of current in case where a high pressure discharge lamp is lighted by a lighting apparatus, which has a modulated light function. As shown in FIG. 17, when a modulated light power lighting command signal becomes ON while the rated power lighting is carried out, the high pressure discharge lamp is lighted with electric power which is decreased to approximately 60 to 80% of that in the rated power lighting to the electrodes.

Also in recent years, for example, a projector with a function called an "AV mute" has been invented. This function temporarily halts projection when an image projection to a screen itself is not needed. Since the internal pressure of a discharge lamp having such a function is high immediately after the discharge lamp is turned off, whereby it cannot be re-lighted at that time, light to be projected on the screen is blocked by shuttering it mechanically or adjusting voltage applied to a liquid crystal panel. Lighting of a lamp in a state where an image is not projected on a screen intentionally, is referred to as "standby power lighting".

The electric power for standby power lighting is desirably at the utmost low level. By lighting the lamp with low electric power that is at the utmost low level, heat generated from the lamp is remarkably reduced, so that it is possible to stop driving or to reduce the speed of a cooling fan, which is a principal cause of a noise from the projector, thereby lowering the noise from the projector to the utmost level. Furthermore, since the thermal load of the lamp can be reduced by lighting the lamp with low electric power, it is possible to substantially extend a life span of the lamp by combining the cases where image projection is required with the cases where projection is not required. The "thermal load of the lamp" means a thermal load to an arc tube and electrodes, and they can be reduced by lowering applied power.

Moreover, a contrast ratio is one of performances of such a projector. The contrast ratio means comparing the luminance in a white state (bright state) on a projected screen to that in a black state (dark state) on the projected screen. Since a high contrast image can be projected with a high contrast ratio is high, a high contrast ration is considered as the important a feature in a projector as brightness.

The technology (such as an iris function), in which a black state is created by, for example, providing the above-mentioned mechanical shutter function in order to make a contrast ratio high, is adopted. There is demand for a high pressure mercury lamp, in which, while predetermined brightness or more is required in an operation of rated power as mentioned above, the modulated light power lighting is available, and further the standby power lighting in which modulated light power is extremely is restricted, is available.

SUMMARY

Although, as mentioned above, there is a demand for the high pressure mercury lamp capable of the standby power lighting in which electric power is extremely limited while a rectangle wave alternating current is supplied, the problem set forth below occurs. Japanese Patent Application Serial No. 2006-332015 teaches that, in this kind of high pressure mercury lamp, a projection is formed at a tip portion of an electrode during lighting, so that arc electric discharge can be stably formed, taking the projection as a starting point form. Japanese Patent Application Serial No. 2006-332015 teaches that a projection, which serves as a starting point of an arc, can be maintained by changing steady frequency, and low frequency, which is intermittently (periodically) inserted therein, or the number of waves thereof, according to lamp voltage or lamp lighting electric power, so that a stable operation can be performed.

However, with the above-mentioned technology, when a high pressure discharge lamp whose rated power was 180 W, was turned on with 90 W, an arc starting point was not stabilized at any combination of these frequencies, so that the so-called flicker phenomenon and so-called "light-out of a lamp" often occurred. When the lamp was turned on with 70 W or less in case of the rated power of 180 W, a flicker remarkably occurred, and when the lamp was turned on with 30 W or less, the "light-out of a lamp" occurred.

It is an object of the present invention to offer a lighting apparatus and a projector with such a high pressure discharge lamp lighting apparatus mounted, wherein the position of an arc starting point of a discharge lamp is stabilized thereby preventing occurrence of the so-called flicker even where it is operated with electric power $0.5 \times P$ (W) or less (in which the maximum operation power is P (W) in a lighting steady state), and wherein deformation of electrodes is suppressed, so that it is possible to stably operate the lamp with even very low electric power without affecting a lighting operation in a screen image projection mode.

The present invention relates to a high pressure discharge lamp lighting apparatus in which a pair of electrodes is arranged in an electric discharge container made of silica glass, so as to face each other at an interval of 2 mm or less, that encloses 0.2 mg/mm$^3$ or more of mercury, halogen in a range of 10-6 μmol/mm$^3$ to 10-2 μmol/mm$^3$, and a predetermined amount of rare gas in an electric discharge container. Further, a power supply apparatus that supplies a rectangle wave alternating current to the high pressure discharge lamp for lighting. Furthermore, when it is operated by electric power of $0.5 \times P$ (W) or less, when maximum operation power P (W) in a steady lighting state except an initial lighting period which is immediately after starting, where a first polarity driving period of a rectangle wave alternating current is Ta (seconds), and a second polarity driving period is Tb (seconds), an operation is performed so that the second polarity driving period Tb is 5 ms or less (Tb≦5 ms) and a ratio Tb/Ta of these two driving periods is 0.1 or less (Tb/Ta≦0.1).

BRIEF DESCRIPTION OF THE DRAWINGS

Other features and advantages of the present high pressure discharge lamp lighting apparatus and a projector using the same will be apparent from the ensuing description, taken in conjunction with the accompanying drawings, in which:

FIG. 1 is a diagram showing a high pressure discharge lamp for a high pressure discharge lamp lighting apparatus according to the present invention;

FIG. 2 is a diagram showing an electrode of a high pressure discharge lamp for a high pressure discharge lamp lighting apparatus according to the present invention;

FIG. 3 shows a state of a projection of an electrode of a high pressure discharge lamp which is deformed;

FIG. 8 is a diagram showing an example of a lighting electric power command signal and electric power/current waveform when changing from a steady lighting operation to standby power lighting;

DESCRIPTION

Figure 4:
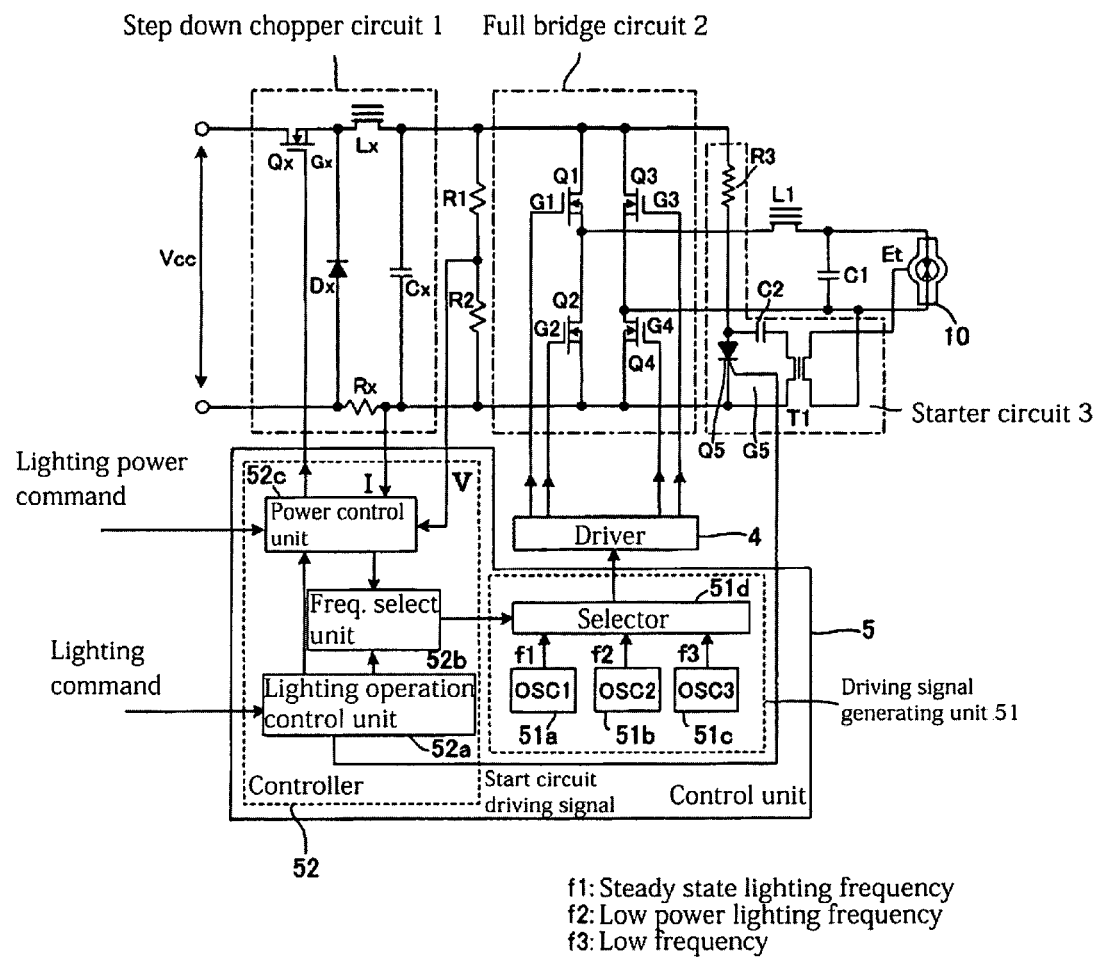
FIG. 4 is a diagram showing the structure of a high pressure discharge lamp lighting apparatus according to an embodiment of the present invention.

First, the arc starting point portion was studied while electric power was gradually lowered to observe a state where a flicker phenomenon occurred in an alternating current drive operation. Under this state, the lamp was operated with electric power still lower than the above-mentioned modulated lighting electric power of the prior art. For example, when electric power applied to the lamp, in which rated operation of 180 W was performed, was gradually changed, provided the frequency thereof was the same as that of rated operation (hereinafter referred to as rated frequency), it was found out that a projection portion, which formed an arc starting point, was deformed at 140 W. Furthermore, based on Japanese Patent Application Serial No. 2006-332015, the frequency could be found at which it was operated stably by as low as 130 W by selecting frequency lower than the rated operation frequency as operational frequency at modulated lighting (hereinafter referred to as modulated light frequency), and further inserting the lower frequency intermittently therein. Further, the projection deformation was found even though any frequency was selected when the electric power was further lowered.

The projection portion deformation description will be given below, referring to FIGS. 3A through 3D. FIGS. 3A though 3D are schematic diagrams of an arc tube portion of a high pressure discharge lamp, wherein an arc A is formed between electrodes 20. In order to suppress an arc tube blackening phenomenon in which tungsten, which is electrode forming material, evaporates due to heat at lighting and adheres to a tube wall of the arc tube when a high pressure discharge lamp is lighted with rated power, a halogen substance is enclosed in the arc tube so that a halogen cycle may be facilitated. The evaporated tungsten combines with halogen, and it becomes a cation when it comes back to the arc plasma by a convection flow and is ionized there. The tungsten that has become the cation is pulled near to and deposited at an area centering on an arc spot, which is the electric field concentrating point of the tip of the electrode in a side of a cathode phase. Next, if the phase of the electrode is reversed to an anode phase, the tungsten at the tip of the electrode, which has been deposited in the cathode phase, evaporates again since electrons that collide with the tip of the electrode raise the electrode's temperature.

The deposition and the evaporation thereof is balanced so that the moderate projection is stably maintained at the tip of the electrode at time of the rated power lighting (FIG. 3A). However, since the temperature of the tip portion of the electrode in the cathode phase state becomes lower when it is lit by electric power lower than rated power at time of a modulated light operation, i.e., when it is lighted by electric power lower than the rated power, the arc spot, which is the concentration point of the electric field at the tip of the electrode, is limited to part of the projection tip (FIG. 3B). That is, in the projection portion, there is a point on which an electric field tends to be concentrated and a point on which it does not. Since an arc spot portion is very high in temperature, even when it is a cathode phase, tungsten evaporates so that the shape thereof changes (FIG. 3C). The arc spot portion drops in temperature, depending on the deformed shape, so that it moves to a portion where an arc spot tends to be formed (FIG. 3D). Thus, a flicker on a projection screen is recognized when the shape of the projection changes to a trapezoid while the phenomenon and an arc jump are repeated.

To avoid such a phenomenon, a low frequency may be inserted intermittently to raise the temperature at the tip of the electrode. It is easy to assume that the electrode temperature can be raised more by increasing the number of the waves to be inserted. However, in the case of an alternating current drive, since in an anode phase the electrode temperature surely rises and in a cathode phase it drops, which occur in turn, it would appear that there is a limit in temperature rise. Furthermore, when frequency of the low frequency operation is made too low (for example, approximately 10 Hz), a flicker phenomenon occurs, wherein the flicker phenomenon is another phenomenon in which, when the polarity thereof is reversed, change of current is viewed so that the projected screen may be blinking.

Next, when electric power is limited to approximately 30 W, it was checked how a lamp light-out phenomenon would occur. Although the lamp was lighted without any problem immediately after the electric power was changed from the steady lighting to standby lighting, the lamp light-out phenomenon occurred after 10 seconds. When the lamp voltage was checked, it turned out that the lamp voltage went up to approximately 200 V, so that a ballast circuit judged it was unusual voltage and turned off the lamp. On the other hand, when the appearance of the electrode was observed, it turned out that, thermal electrons could not be emitted when the temperature of the electrode becomes very low, so that the so-called glow discharge, in which discharge is carried out all over the electrode, continued. It turns out that a lamp voltage in the glow discharge is higher than that in the arc electric discharge in which discharge occurs in general from a projection formed at the tip portion of the electrode, wherein the voltage reaches approximately 150-200 V. The present inventors identified the causes of the flicker phenomenon and the light-out of the lamp, which are generated when modulated light power is very low as mentioned above, and as a result of examining how to solve this problem wholeheartedly, a lighting method of the high pressure discharge lamp according to the present invention etc. was conceived. In order to accomplish the above object, in a lighting method of a high pressure discharge lamp according to a first invention, a high pressure discharge lamp lighting apparatus, comprising a high pressure discharge lamp in which an electric discharge silica glass container encloses mercury of 0.2 mg/mm$^3$ or more, halogen in a range of 10-6 μmol/mm$^3$ to 10-2 μmol/mm$^3$, and a predetermined amount of rare gas, and a pair of electrodes whose volume is approximately equal and are arranged to face each other at an interval of 2 mm or less; and a power supply apparatus which supplies a rectangle wave alternating current to a discharge lamp so as to turn on the lamp. When the lamp is operated on electric power of 0.5×P (W) or less (when maximum operation power in a steady lighting state except an initial lighting period which is immediately after starting is P (W)) and when a first polarity driving period of a rectangle wave alternating current is Ta (seconds) and a second polarity driving period is Tb (seconds), an operation is performed so that the second polarity driving period Tb is 5 ms or less (Tb≦5 ms) and a ratio Tb/Ta of these two driving periods is 0.1 or less (Tb/Ta≦0.1).

When the second polarity period Tb is 5 mm or less (Tb≦5 ms) in case of 50% or less of electric power in the rated lighting, although it is not necessarily certain whether a stable operation can be performed by setting the ratio of the driving periods Tb/Ta to be 0.1 or less, it is considered as set forth below. In case of very low electric power of the 50% thereof or less, since the temperature of the tip portion of the electrode becomes low, an area, which emits thermal electrons in a cathode phase, becomes smaller than that in a steady lighting operation, and is limited to a very narrow spot. In a steady alternating current driving operation, i.e., a state of Tb/Ta=1, an anode phase and a cathode phase occur (are operated) by turns for the same time as each other. At this time, there is a case where an area which serves as a spot differs for every cathode phase. If the area that serves as a spot differs, the portion which served as a spot last time in a cathode phase drops in temperature, so that that portion is hard to serve as a spot in the following phase. Since an arc always moves around in search for an area which tends to perform a spot operation in a cathode phase, a flicker phenomenon will occur. However, where the polarity is reversed only for a very short period of 5 ms or less (Tb≦5 ms) in the second driving period Tb, and the ratio of the driving periods Tb/Ta is 0.1 or less, since the driving period Tb of the electrode, by which a cathode operation is performed, is very short, a spot is held at the same position so as not to move around, and furthermore, since the electrode in a side of an anode does not drop in temperature beyond necessity, it is possible to maintain a stable electric discharge.

Furthermore, mercury of 0.2 mg/mm$^3$ or more is enclosed in the high pressure discharge lamp according to the present invention. Even if cooling is not performed at all in the case of 50% or less of electric power in rated lighting of such a high pressure discharge lamp, mercury, which cannot evaporate, i.e., non-evaporated mercury, is generated. Although arc tube design for withstanding such steady lighting is determined, taking into consideration performances such as an illumination life span and brightness, in the case of 50% or less of electric power, originally, it does not reach arc tube temperature at which mercury sufficiently evaporates under environment where cooling is not performed. In the prior art, since the non-evaporated mercury hardly exert action in limiting an electric discharge arc and an electric discharge starting point so that the operation pressure drops thereby reducing an optical output, it is considered an undesirable matter. However, it is considered that when it is operated on 50% or less of electric power in rated lighting, an electric discharge arc and an electric discharge starting point are not limited, thereby making it easy to carry out thermal electron emission in the electrode in which a cathode operation is performed, because of contribution to a role of holding the electrode temperature constant.

Direct current lighting can be considered as a method of lighting in which the polarity is held for a predetermined period. Especially, Japanese Patent Application Publication No. 2005-522818 teaches such direct current lighting, which is performed when current is low, as a lamp modulated lighting method.

Japanese Patent Application Publication No. 2005-522818 discloses that, in the case of direct current lighting, it can be operated with sufficiently low current, without light-out of the lamp.

With that, it was confirmed by operating a high pressure discharge lamp according to the present invention in the direct current lighting drive on electric power, which was lower than 0.5×P (W). In this case, it was confirmed that although it was operated stably for approximately 30 minutes, the electrode tip in a cathode side deformed, and after that, when the operation was changed back to steady operation, voltage thereof rises greatly, and screen illumination decreased greatly.

Presumption of how the phenomenon occurred will be given below. Japanese Patent Application Publication No. 2005-522818 teaches that, since the temperature at the tip of the electrode in a side of the cathode in the case of direct current lighting is very low, compared with the temperature thereof at time of a steady operation in which an alternating current drive is carried out, it operates in the so-called spot mode in which discharge is carried out in only part of the electrode tip. Since it operates stably in the spot mode, unlike an alternating current drive, an arc spot does not move. However, a very narrow area portion, which serves as the arc spot, is melted, and is very hot in temperature. Although there is no major impact if it is operated for a short time such as a couple of seconds, the portion, which serves as the arc spot, deforms when the lighting continues for a while.

Next, when, for example, rated lighting was carried out as a steady operation, the deformed electrode tip could not withstand the current at time of the rated lighting, so that it further deformed, whereby voltage thereof rose greatly. Such a phenomenon did not occur in an HID lamp (High Intensity Discharge lamp) in which a distance between electrodes was long and mercury density was low. However, it was considered that, in the case of a high pressure discharge lamp in which a distance between electrodes was short (such as 2 mm or less) and mercury of 0.20 mg/mm$^3$ or more was enclosed, as in the present invention, an arc was limited although there was non-evaporated mercury and the current density was lower than that in the steady operation, since the current density of the tip portion of the electrode could not be ignored, concentration of an arc spot caused deformation of the electrode.

On the other hand, since the driving periods Ta and Tb of an alternating current drive were made asymmetrical (not the same) as in the present invention, and furthermore, the second driving period Tb was 5 ms or less (Tb≦5 ms), and Tb/Ta is 0.1 or less (b/Ta≦0.1), while the arc spot at the tip of the electrode, in which a cathode operation was carried out, was fixed during the period Tb, the temperature of electrode tip, in which an anode operation was carried out when the polarity thereof was reversed, could be kept proper for a suitable period, whereby a stable operation could be performed for a long time.

In case of Tb/Ta is 0.1 or less, even if electric power was very low, that is, 0.5×P (W) when the maximum operation power was P (W), generation of a flicker could be suppressed so that an operation could be stably performed. However, when it was lighted over a long time period, the electrode tip deformed slightly so that the position of a projection formed at the tip portion thereof changed (shifts therefrom). Specifically, although a very narrow area of the projection portion melted, where the periods Ta and Tb were long (for example, Ta is 5 ms and Tb is 50 ms) even when Tb/Ta was 0.1 or less (Tb/Ta≦0.1), since the melted portion had a certain size and the tip portion of the projection was slightly deformed during a long lighting, the position of the projection changed gradually (shifted therefrom) in the narrow area. When a distance between electrodes is longer than 2.0 mm, the problem of the deformation amount was not relatively big even though the position of the projection was slightly shifted. However, when the distance between electrodes was very short such as 2.0 mm or less, shifting of the position of the projection started to affect the screen illumination. Especially, it was found that due to the miniaturization of an LCD panel or DMD (Digital Mirror Device), such slight deformation also caused some problem in prolonged use. From such a result, in order to secure a longer life span, the ratio of Tb/Ta was examined more strictly. Consequently, in case of Tb/Ta≦0.05, it turned out that the tip portion of the electrode could be stably maintained without any slight shifting of the projection over a long time period. On the other hand, when the period Tb was very short and the ratio of Tb/Ta was small, the phenomenon in which the projection position of the electrode tip portion was shifted, was observed. When the current waveform in a state where the phenomenon occurred was observed, it turned out that excessive overshoot current was flowing, at time the polarity thereof changed, especially in the driving period Ta whose driving period was long.

In a circuit (refer to FIG. 4), this overshoot current was generated for the reasons set forth below. Although a rectangle wave-like alternating current voltage was generated by turning on, by turns, switching elements Q1 and Q4 and switching elements Q2 and Q3 of a full bridge circuit 2, a reactor Lx of a step down chopper circuit 1 could not intercept a current instantaneously allowing that current to continue flowing there through. Namely, even if voltage was intercepted by a switching element Qx, a current component due to the reactor Lx was superimposed thereon at time of a polarity change. This current value and the superposing period were determined by a constant determined by the reactor Lx and a smoothing capacitor Cx. Although, in order to make a portion of this superposition small, an overshoot current value and an overshoot period could be made small by finely controlling the duty ratio in the switching element Qx etc., it could not be suppressed completely. Moreover, when only a resistor was used for the reactor Lx, the above-mentioned overshoot current was suppressed, but a loss of heat generation arose. Therefore, in a practical circuit structure, it was not a perfect rectangle wave, and, at time of a polarity change, overshoot current was superimposed in general. When the period Tb was shorter than a period during which this overshoot current flowed, part of overshoot current was superimposed thereon in the period Ta. Since in addition to this reversed overshoot current, overshoot current which was unavoidably generated at time of a polarity change, was superimposed thereon, larger overshoot current was supplied thereto during the period Ta. Thus, it turned out that, when the period of Tb was very short, excessive overshoot current flowed through the circuit during the period Ta, so that even if the ratio Tb/Ta was 0.05 or less, the projection at the tip of the electrode slightly deformed, whereby the position of the projection may be shifted. Although the position shifting of such a projection did not occur until the period Tb was approximately 0.05 ms and the period Ta was approximately 100 ms, i.e., the ratio Tb/Ta was approximately 0.0005 (Tb/Ta=0.0005), when the period Tb was less than 0.05 ms and the period Ta was held to 100 ms or more, projection position shifting occurred. As a result of the above-mentioned detailed examination, it turned out that in order to suppress a flicker accompanying deformation of such an electrode tip, and to suppress attenuation of the screen illumination over a long time period, the period Tb must be 0.0 5 ms to 5 ms and the ratio Tb/Ta of the driving periods must be 0.0005 to 0.05.

In view of the above, objects of the present invention will be attained as set forth below.

A high pressure discharge lamp lighting apparatus that comprises a high pressure discharge lamp, in which a discharge container made of silica glass encloses mercury of 0.20 mg/mm$^3$ or more, halogen in a range of $10^{-6}$ μmol/mm$^3$ to $10^{-2}$ μmol/mm$^3$, and a certain amount of rare gas and a pair of electrodes is arranged to face each other at an interval of 2 mm; and a power supply apparatus, which supplies a rectangle wave alternating current to a discharge lamp so as to turn on the lamp. Thus, when the apparatus is operated on electric power of 0.5×P (W) or less in case where the maximum operation power in a steady lighting state, except in an initial lighting period immediately after starting, is P (W) and when a first polarity driving period of a rectangle wave alternating current is Ta (seconds) and a second polarity driving period is Tb (seconds), the apparatus is operated so that the second polarity driving period Tb is 5 ms or less (Tb≦5 ms) and a ratio Tb/Ta of these two driving periods is 0.1 or less (Tb/Ta≦0.1).

Further, Tb may be larger than 0.05 ms and smaller than 5 ms (0.05 ms≦Tb≦5 ms), and Tb/Ta may be larger than 0.0005 and smaller than 0.05 (0.0005≦Tb/Ta≦0.05).

Furthermore, when an operation is performed by electric power, which is higher than 0.5×P (W) after the operation is performed by electric power of 0.5×P (W) or less, where the first polarity driving period of the rectangle wave alternating current is Ta (seconds) and a second polarity driving period is Tb (seconds), the operation may be switched to a steady state lighting operation from a state where the second polarity period Tb is 5 ms or less (Tb≦5 ms) and the ratio of the driving periods is 0.1 or less (Tb/Ta≦0.1), while changing frequency thereof and/or electric power.

Also, the above high pressure discharge lamp lighting apparatus may be mounted in a projector having a function of projecting an image.

Further, when there is no change in an image signal of the projector for a predetermined period while the discharge lamp is lit by electric power higher than 0.5×P (W), the electric power mode may be shifted to an electric power mode of 0.5×P (W) or lower.

Furthermore, when there is no change in the image signal of the projector for a predetermined period while the discharge lamp is lit by electric power of 0.5×P (W) or less, the high pressure discharge lamp may be automatically turned off.

Furthermore, while the discharge lamp is lighted by electric power of 0.5×P (W) or less, the high pressure discharge lamp may be automatically turned on in conjunction with a detecting unit.

Effects according to the present invention will be described below.

When the apparatus is operated on standby electric power that is low lamp lighting power of 0.5×P (W) or less wherein the maximum operation power is P (W), and when a first polarity driving period of a rectangle wave alternating current is Ta (seconds) and a second polarity driving period is Tb (seconds), and since it is operated so that the second polarity driving period Tb is 5 ms or less (Tb≦5 ms) and a ratio Tb/Ta of these two driving periods is 0.1 or less (Tb/Ta≦0.1), it is possible to stabilize, in position, an arc starting point of the discharge lamp and to prevent generation of the so-called flicker. Thus, it is possible to light the lamp stably, without light-out of the lamp, by very low electric power.

When the first polarity driving period Ta (seconds) of a rectangle wave alternating current and the second polarity driving period is Tb (seconds), and since, the second polarity driving period Tb is set to 0.05 ms or greater and 5 ms or less (0.05 ms≦Tb≦5 ms), and the ratio between the driving periods Tb/Ta is set to 0.0005 or greater and 0.05 or less (0.0005≦Tb/Ta≦0.05), a position gap (position shifting) of the projection formed at the tip portion of the electrode can be prevented by preventing deviation of the thermal load to the electrode, so that even if it is operated on standby electric power over a long time period, the property of illumination life span can be secured.

Where it is operated by electric power that is 0.5×P (W) or higher after it is operated by electric power of 0.5×P (W) or lower, when the first polarity driving period of the rectangle wave alternating current is Ta (seconds) and a second polarity driving period is Tb (seconds), and since, the second polarity period Tb is 5 ms or less (Tb≦5 ms) and the ratio of the driving periods is shifted from a state of Tb/Ta≦0.1 to a steady lighting operation, changing frequency thereof and/or electric power, it is possible to further lower the thermal load to the electrode so that the temperature of the electrode can be gradually raised. For this reason, it is possible to prevent damage etc. on the tip portion of the electrode by heat stress etc.

Regarding mounting the high pressure discharge lamp lighting apparatus in a projector, if there is no change in an image signal of the projector for a predetermined period while the discharge lamp is lighted by electric power that is higher than 0.5×P (W), the electric power mode is shifted to an electric power mode of 0.5×P (W) or lower. Therefore, it is possible to prevent unnecessary consumption of electric power, thereby saving electric power.

Further, if there is no change in an image signal of the projector for a predetermined period while the discharge lamp is lit by electric power of 0.5×P (W) or lower, the high pressure discharge lamp is automatically turned off, so as not to forget to turn off the lamp.

Further, while the discharge lamp is lit by electric power lower than 0.5×P (W), the projector is turned on in conjunction with a detecting unit. Therefore, it is possible to prevent waste of electric power so as to save electric power.

Further description of an embodiment according to the present invention will be given below.

FIG. 1 shows a high pressure discharge lamp according to the present invention. A high pressure discharge lamp 10 has an approximately spherical light emission section 11 which is formed of an electric discharge container made of silica glass. A pair of electrodes 20 is arranged to face each other at an interval of 2 mm or less in the light emission section 11. Moreover, sealing portions 12 are formed at both ends of the light emission section 11. In each sealing portion 12, a metallic foil 13 for electric conduction, which is made of molybdenum, is airtightly buried by, for example, shrink sealing. An axis portion of each of electrodes 20 is joined to one end of the metallic foil 13, and an external lead 14 is joined to the other end of the metallic foil 13, so that electric power is supplied thereto from an external power supply apparatus. Mercury, rare gas, and halogen gas are enclosed in the light emission section 11. Mercury of 0.20 mg/mm$^3$ is enclosed to obtain radiation light of a required visible light wavelength, for example, 360-780 nm, and the amount thereof to be enclosed depends on the temperature condition thereof. The vapor pressure thereof becomes very high, in case of 200 atmospheric pressure at time of lighting. By increasing the enclosed amount of the mercury, a discharge lamp in which the high mercury vapor pressure of 250 or more atmospheric pressure or 300 atmospheric pressure or more at time of lighting, can be produced, whereby a light source that is more suitable for a projector apparatus can be realized, as the mercury vapor pressure thereof becomes higher.

For example, argon gas of approximately 13 kPa is enclosed therein as the rare gas. The function thereof is to improve the lighting starting nature. Iodine, bromine, chlorine, etc. are enclosed as the halogen in form of a compound with mercury or other metal. The enclosed amount of halogen is 1×10$^{-6}$ µmol/mm$^3$ to 1×10$^{-2}$ µmol/mm$^3$. Although a function of the halogen is to extend a life span by using the so-called halogen cycle, there is also a function of preventing devitrification of the electric discharge container, in case where the discharge lamp is very small and the lighting vapor pressure thereof is very high as in the high pressure discharge lamp of the present invention. The specification (numerical examples) of an embodiment of the discharge lamp is set forth below. For example, the maximum outer diameter of the light emission section is 9.4 mm, the distance between the electrodes is 1.0 mm, and the internal volume of the arc tube is 55 mm$^3$. Rated voltage applied thereto is 70 V, and rated power applied thereto is 180 W.

Moreover, this kind of a discharge lamp is built in a projector apparatus for a miniaturization purpose, in which while a severe miniaturization is required in an overall dimension, high intensity of light emission is also required. For this reason, the thermal influence on the light emission section becomes very severe. A bulb wall load value of the lamp is 0.8-2.5 W/mm$^2$, specifically, 2.4 W/mm$^2$. When the discharge lamp with a high mercury vapor pressure and bulb wall load value is installed in an apparatus for presentation (such as in a projector apparatus or in an overhead projector), it is possible to provide radiation light with good color rendering property. FIG. 2 is a diagram of an electrode having a projection wherein the tip of the electrode 20 shown in FIG. 1 is schematically shown. Each of the electrodes 20 consists of a sphere section 20a and an axis portion 20b, and a projection 21 is formed at the tip of the sphere section 20a of each electrode 20. Here, the above-mentioned projection 21 becomes essential, when it is used as a light source of a projector apparatus in which a distance between electrodes is 2 mm or less, and mercury of 0.2 mg/mm$^3$ or more is contained in the light emission section as in the discharge lamp according to the present invention. This is because the mercury of 0.2 mg/mm$^3$ or more is contained in the light emission section, and in the discharge lamp in which the pressure in an operation amounts to 200 or more atmospheric pressure, arc electric discharge is limited so as to be small in size by high vapor pressure thereof, so that an electric discharge starting point is also limited to be small. Moreover, since arc electric discharge occurs from the projection, which serves as the starting point, when the projection 21 is formed at the tip of the electrode, light from the arc is hard to be blocked by the sphere section 20a of the electrode. For this reason, there are advantages that the usage efficiency of light is improved, and that a brighter image is obtained. Although FIG. 2 is a schematic diagram, there is usually an element corresponding to the spherical portion which has a larger diameter than that of the axis at the tip of the axis portion 20b.

FIG. 4 shows a power supply apparatus for lighting the above-mentioned discharge lamp. The lighting apparatus is made up of the discharge lamp 10 and the power supply apparatus. The power supply apparatus comprises a step down chopper circuit 1 to which direct-current voltage is supplied, a full bridge type inverter circuit 2 (hereinafter referred to as a "full bridge circuit") that supplies to the discharge lamp 10 alternating current voltage that is converted from direct-current voltage output from an output side of the step down chopper circuit 1, a coil L1 that is connected in series to the discharge lamp, a capacitor C1, a starter circuit 3, a driver 4 that drives switching elements Q1-Q4 of the above-mentioned full bridge circuit 2, and a control unit 5. The control unit 5 may be configured by a processing unit, such as a microprocessor. FIG. 4 shows a block diagram showing a functional structure thereof. In FIG. 4, the step down chopper circuit 1 comprises a switching element Qx and a reactor Lx which are connected to a plus terminal of a power supply to which the direct current voltage is supplied, a diode Dx whose cathode side connected a connecting point between the switching element Qx and the reactor Lx and whose anode side is connected to a minus terminal of the power supply, a smoothing capacitor Cx which is connected to an output side of the reactor Lx, and a resistor Rx for current detection, which is connected between the minus terminal of the smoothing capacitor Cx and the anode side of the diode Dx. By driving the switching element Qx at a predetermined duty ratio, the input direct current voltage Vcc is stepped down to a certain voltage according thereto. A series circuit of resistors R1 and R2 for voltage detection is provided in an output side of the step down chopper circuit 1. The full bridge circuit 2 includes the switching elements Q1-Q4 connected so as to form a bridge, in which the switching elements Q1 and Q4 and the switching elements Q2 and Q3 are turned ON by turns, so that square wave alternating voltage occurs between a contacting point of the switching elements Q1 and Q2 and a contacting point of the switching elements Q3 and Q4. The starter circuit 3 comprises a series circuit of a resistor R3 and a switching element Q5, a capacitor C2 and a transformer T1. When the switching element Q5 is turned on, electric charges charged in the capacitor C2 are discharged through the switching element Q5 and a primary side coil of the transformer T1, so that a pulse-like high voltage occurs in a secondary side of the transformer T1. This high voltage is impressed to an auxiliary electrode Et of the discharge lamp 10, thereby turning on the lamp.

When the first polarity driving period of the rectangle wave alternating current is Ta (seconds) and a second polarity driving period is Tb (seconds), and when a first polarity driving period of a rectangle wave alternating current is Ta (seconds) and a second polarity driving period is Tb (second), in order that the second polarity driving period Tb is 5 ms or less (Tb≦5 ms) and a ratio Tb/Ta of these two driving periods is 0.1 or less (Tb/Ta≦0.1), an operation may be performed by adjusting the switching cycle of the switching elements Q1-Q4 of the full bridge circuit 2. Moreover, an output voltage may be attained by adjusting the duty ratio in an operation of the switching element Qx of the step down chopper circuit 1. According to the duty ratio of a gate signal Gx, the switching element Qx of a step down chopper circuit 1 is turned on and off, so that electric power supplied to the lamp 10 is changed. That is, for example, if electric power is raised, the duty ratio of Qx is decreased. Thus, the gating signal Gx is controlled so that it becomes an electric power value corresponding to a value of an inputted electric power adjusting signal.

The control unit 5 includes a drive signal generating unit 51 and a controller 52. The drive signal generating unit 51 is made up of, for example, alternating current signal generating units 51a-51b in which the second polarity period Tb is 5 ms or less (Tb≦5 ms), an asymmetrical rectangle wave signal generating unit 51c which generates a rectangle wave with an asymmetrical drive period so that the ratio of the drive period may be set to Tb/Ta≦0.1, and a selector 51d which selects one (some) of outputs thereof. An output of the alternating current signal generating units 51a-51b and the asymmetrical rectangle wave generating unit 51c is selectively outputted, so that a drive signal for driving the switching elements Q1-Q4 of the full bridge circuit 2 is generated. The controller 52 includes a lighting operation control unit 52a which controls a lighting operation of the lamp 10, and an electric power control unit 52c, which controls lamp electric power, by driving the switching element Qx of the step down chopper circuit 1 at the set duty ratio according to a lighting electric power command from the outside. Moreover, in order to set up the drive signal of the switching elements Q1-Q4, it has a frequency selection unit 52b which sends out a frequency selection command to the selector of the drive signal generating unit 51 according to steady lighting, or standby power lighting which is operated by electric power of 0.5×P (W) or less.

Figure 7:
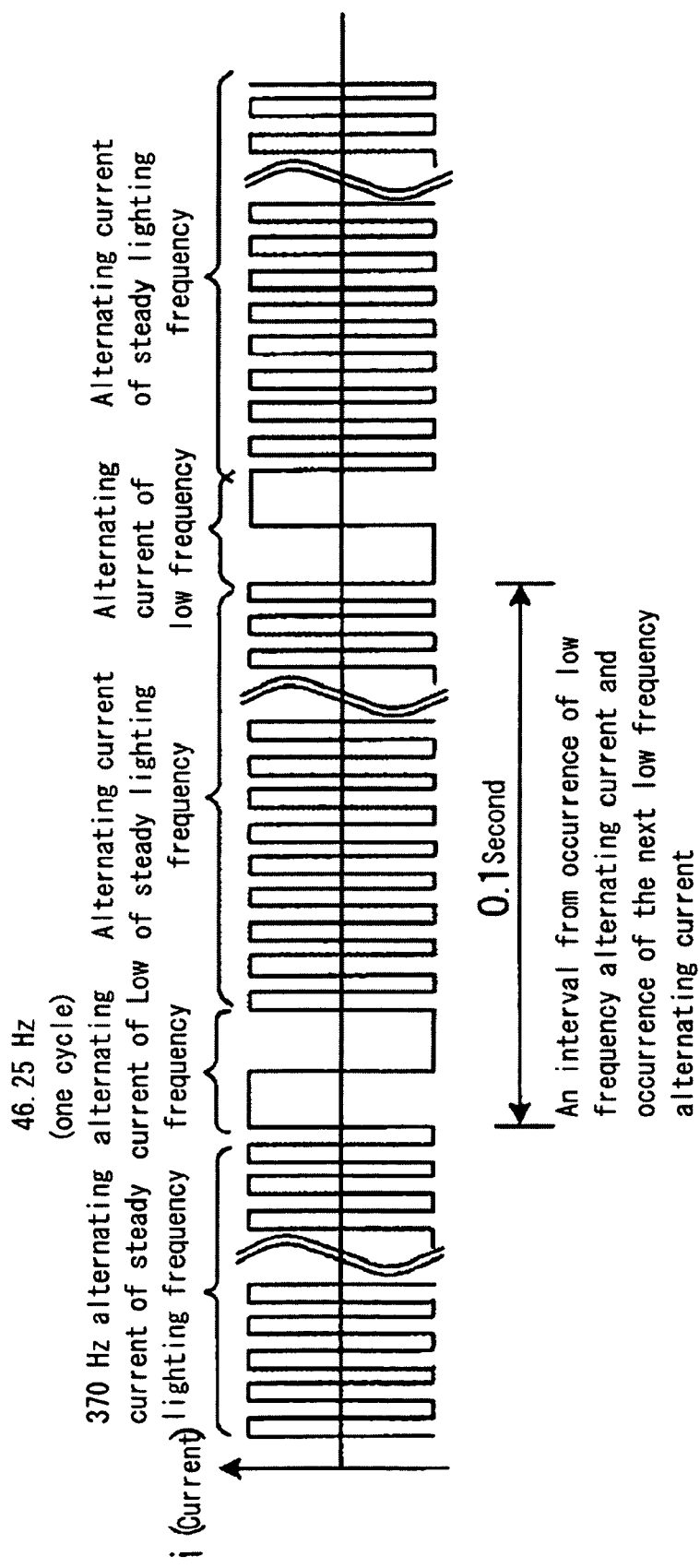
FIG. 7 is a diagram showing an example of a current waveform of a discharge lamp at time of a steady lighting operation.

The electric power control unit 52c detects lamp current I from voltage between both ends of the resistor Rx for current detection, and lamp voltage V from voltage detected by the resistors R1 and R2 for voltage detection, whereby lamp electric power is calculated, and the duty ratio of the switching element Qx of the step down chopper circuit 1 is controlled, so that the electric power is in agreement with the lighting electric power command. Moreover, according to steady lighting or standby power lighting, a frequency/asymmetrical rectangle wave selection signal is sent out to the frequency selection unit 52b. The selector 51d selectively sends out an output of the alternating current signal generating units 51a-51b and the asymmetrical rectangle wave signal generating unit 51c to the driver 4 according to the instructions from frequency selection unit 52b. An output of the alternating current signal generating unit 51a, which outputs steady lighting frequency, and an output of the alternating current signal generating unit 51b, which outputs low frequency, is alternatively selected, wherein, for example, a signal having waveform as shown in FIG. 7 (described below) is outputted. Moreover, in the case of standby power lighting, the output of the asymmetrical rectangle wave signal generating unit 51c is selected, wherein, for example, a signal having waveform as shown in FIG. 8 (described below) is outputted. In addition, the asymmetrical rate (Tb/Ta) of the rectangle wave outputted from the asymmetrical rectangle wave signal generating unit 51c, may be increased or decreased according to a value of Tb, depending to an asymmetrical ratio increasing/decreasing signal outputted from the frequency selection unit 52b. When a lighting operation is shifted from steady lighting to lighting, electric power may be gradually reduced from 0.5×P (W) or less to the standby lighting electric power, and a rapid change of electrode temperature can be further suppressed. In this case, it may be realized by shifting to the standby power lighting while gradually reducing the electric power by controlling the duty ratio of the switching element Qx of the step down chopper circuit 1. Moreover, as described below, when electric power in operation is gradually increased when shifting to steady lighting from standby electric power lighting or when shifting to steady lighting while gradually shortening an anode driving period in a side of the electrode (changing Tb/Ta), which has performed an anode operation, the electric power supplied to the lamp is gradually increased by the electric power control unit 52c, or the asymmetrical rate of a rectangle wave is controlled by the asymmetrical ratio increasing/decreasing signal sent out to the asymmetrical rectangle wave signal generating unit 51c.

Figure 5:
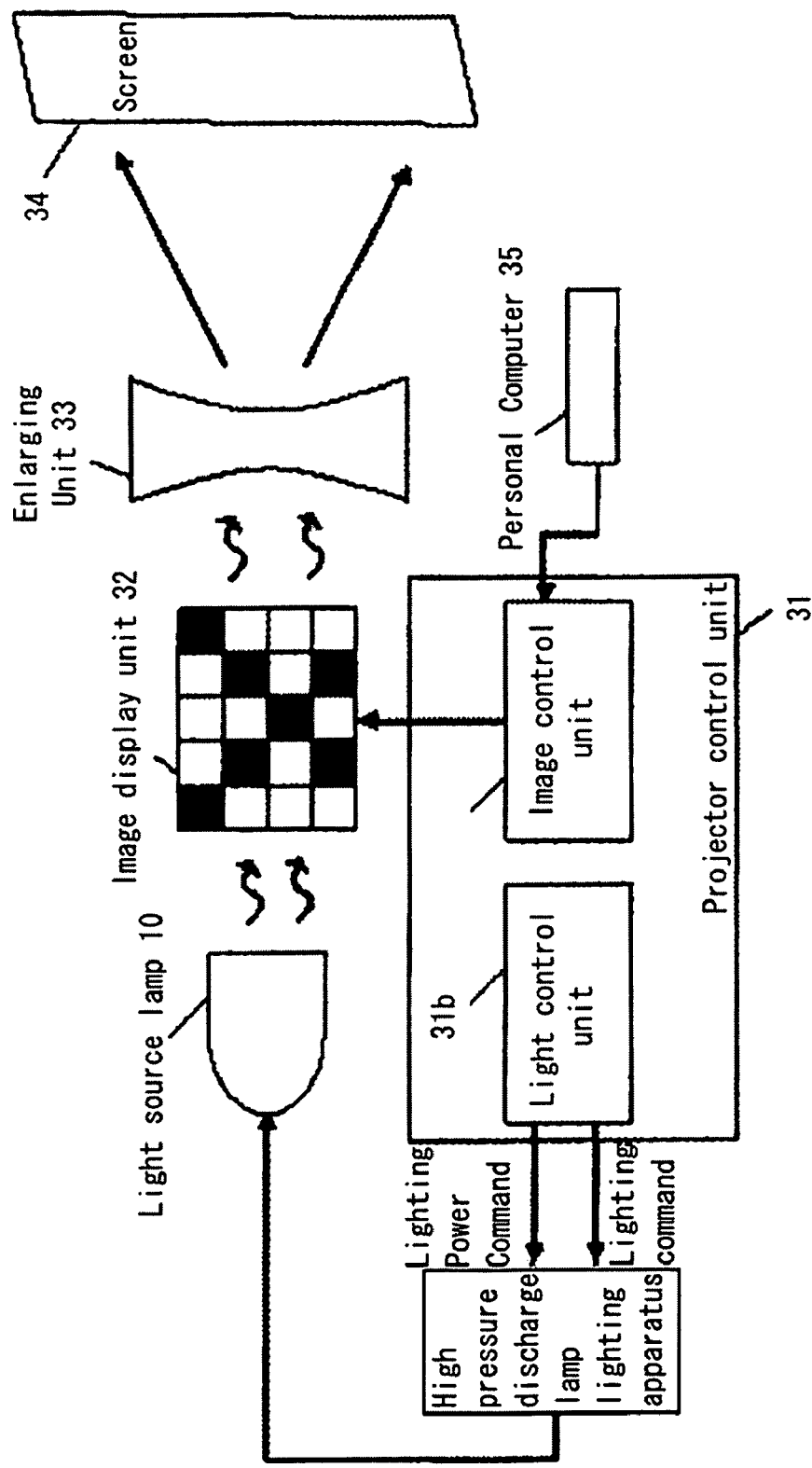
FIG. 5 is a diagram showing a structural example of a projector on which a high pressure discharge lamp lighting apparatus according to an embodiment of the present invention is mounted.

FIG. 5 shows a configuration example of a projector in which the high pressure discharge lamp lighting apparatus according to the present embodiment is installed. The projector comprises the above mentioned high pressure discharge lamp lighting apparatus 30, the high pressure discharge lamp 10, a projector control unit 31, an image display unit 32 that is made up of a liquid crystal display or another display common in the art, and an enlarging unit 33, which enlarges and displays an image displayed on the image display 32 in which the image enlarged by the enlarging unit 33 is projected onto a screen 32. The projector control unit 31 is equipped with an image control unit 31a that processes an image signal given from an external apparatus such as a personal computer 35 or a television, and a light control unit 31b that sends out a lighting command and a lighting power command to the high pressure discharge lamp lighting apparatus 30.

Figure 6:
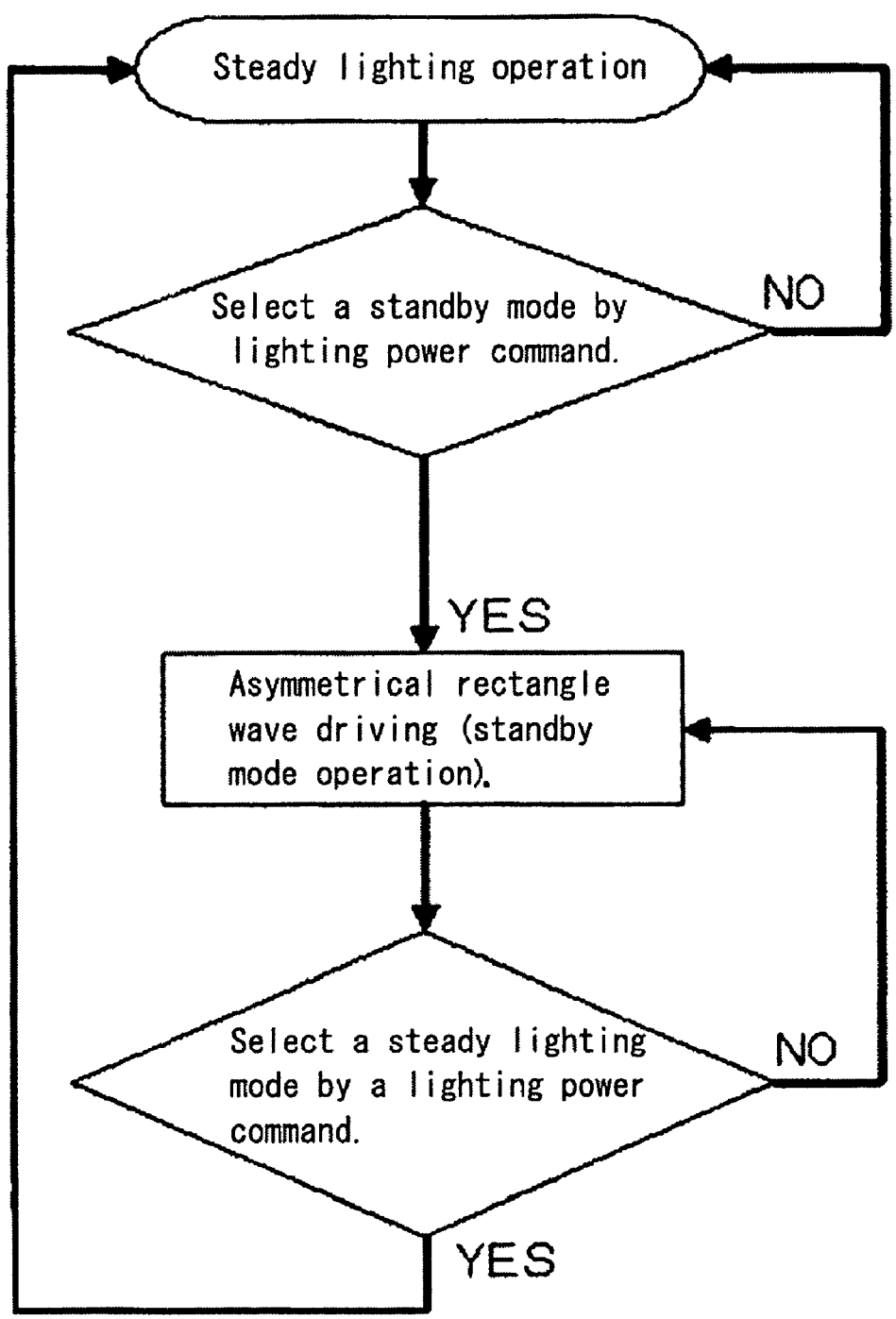
FIG. 6 is a flow chart showing an example of the content of processing in case where switching control to standby power lighting mode is performed.

Next, description of control for shifting from a steady lighting operation mode to a standby power lighting mode according to this embodiment will be given below. FIG. 6 is a flow chart showing an example of switching processing performed by the control unit 5 shown in FIG. 4. The steady lighting mode means an operation on "rated power" and "modulated light power." In addition, although the lighting electric power in "modulated light power" is determined by the design of the high pressure discharge lamp and the power supply apparatus, the "modulated light power" means an operation on approximately 60-80% of "rated power". In FIG. 6, when the standby power mode is selected by a lighting electric power command signal given to the control unit 5, the control unit 5 shown in FIG. 4 selects an asymmetrical rectangle wave for generating a rectangle wave that is asymmetrical, so that the second polarity period Tb is 5 ms or lower (Tb≦5 ms), and the ratio of the driving periods is 0.1 or less (Tb/Ta≦0.1). That is, the frequency selection unit 52b makes the selector 51d select an output of the asymmetrical rectangle wave signal generating unit 51c, and then the driver 4 sends the driving signal having the asymmetrical rectangle wave to the switching elements Q1-Q4, so that the Q1, Q4, and Q3 and Q2 are turned on by turns in which on-time of Q1 and Q4 and that of Q3 and Q2 are asymmetrical (not the same), whereby the high pressure discharge lamp 10 performs an asymmetrical rectangle wave driving. Moreover, when a lighting electric power command signal selects a steady lighting mode, a lighting operation is performed by rectangle wave alternating current lighting. That is, the frequency selection unit 52b makes the selector 51d select an output of the alternating current signal generating units 51a and 51b, and the driver 4 gives an alternating current drive signal to the switching elements Q1-Q4, so that the switching elements Q1 and Q4, and Q3 and Q2 are turned on by turns, thereby supplying alternating current rectangle wave current to the high pressure discharge lamp 10.

FIG. 7 shows an example of a current waveform of the discharge lamp 10 at time of a steady lighting operation, wherein a vertical axis is a current value and a horizontal axis is time. The power supply apparatus shown in FIG. 4 is operated as set forth below, so as to supply current in a pattern shown in FIG. 7 to the lamp at time of steady lighting.

(1) When a lighting command is given, while the electric power starts to be supplied to the lamp 10, the lighting operation control unit 52a of the controller 52 generates a starting circuit drive signal, and triggers the starter circuit 3, thereby turning on the lamp 10.

(2) When the lamp 10 is lit, in the electric power control unit 52c, lighting electric power is calculated based on a voltage value V detected by the dividing resistors R1 and R2 and a current value I detected by the resistor Rx.

(3) Based on a lighting power command signal and the electric power value calculated above, the electric power control unit 52c of the controller 52 controls the switching element Qx of the step down chopper circuit 1, thereby controlling lighting electric power.

(4) At time of steady lighting, the frequency selection unit 52b of the controller 52 selects an output of the alternating current signal generating unit 51a, and an output of the alternating current signal generating unit 51b by the selector 51d of the drive signal generating unit 51, so as to output steady state lighting frequency signal f1 and low frequency signal f2 by turns from the selector 51d. The output of the selector 51d is given to the switching elements Q1-Q4 of the full bridge circuit 2 through the driver 4. Although the switching elements Q1-Q4 are driven by the steady state lighting frequency signal f1 (60-1000 Hz) at time of the steady lighting, as mentioned above, it is driven at the low frequency signal f2 (5-200 Hz), which is lower than steady state lighting frequency, every first predetermined time interval (0.01 seconds-120 seconds), for a second predetermined time period (a period of a half cycle of this low frequency signal to 5 cycles thereof) (refer to waveform at time of steady lighting of FIG. 7).

FIG. 8 shows an example of a lighting electric power command signal and electric power and current waveforms when switching from a steady lighting operation to standby power lighting, wherein a vertical axis shows a signal level, a current value, and an electric power value, and a horizontal axis shows time. At time of a steady lighting operation, as mentioned above, alternating current of frequency selected from a range of 60-1,000 Hz as steady lighting frequency is supplied to the high pressure discharge lamp. And when a signal of the standby power lighting is detected, as described above, the control unit 5 selects the asymmetrical rectangle wave driving for generating an asymmetrical rectangle wave, in a driving period of which the second polarity period Tb is 5 ms or less (Tb≦5 ms), and the ratio of the drive periods Tb/Ta is 0.1 or less (Tb/Ta≦0.1), so that it is lit with the asymmetrical rectangle wave current. A concrete example of waveforms at time of steady lighting and standby power lighting is shown in Table 1. In addition, in Table 1, (a) and (b) correspond to waveforms in periods (a) and (b) shown in FIG. 8.

TABLE 1

| Waveform at time of steady lighting (a) | |
|---|---|
| Rated electric power | 180 W, 90 V, 2.0 A |
| Steady lighting frequency | 370 Hz |
| Rectangle wave lighting period Ta | 1.35 ms |
| Rectangle wave lighting period Tb | 1.35 ms |
| Waveform at standby electric power lighting (b) | |
| Electric power | 45 W, 45.6 V, 0.99 A |
| Rectangle wave lighting period Ta | 50 ms |
| Rectangle wave lighting period Tb | 0.1 ms |

Figure 9:
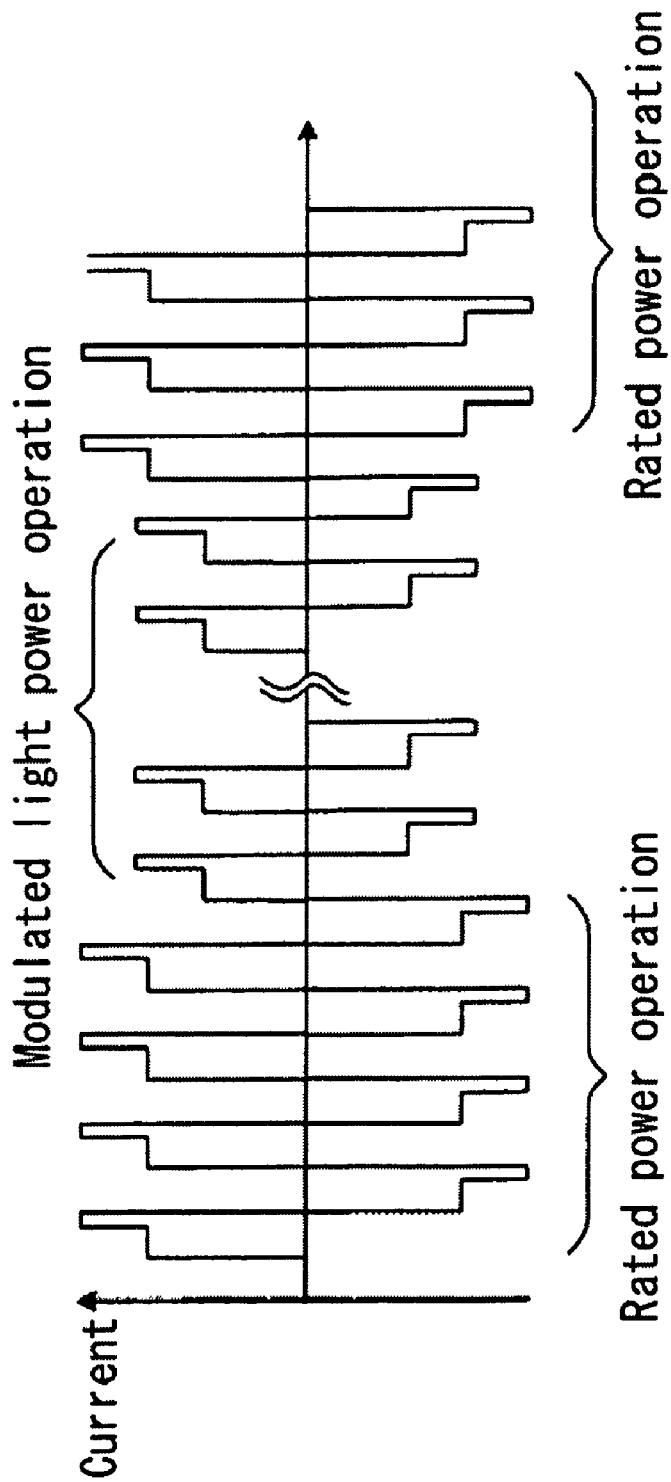
FIG. 9 is a diagram showing an example of a waveform in which a pulse is superimposed on alternating current waveform at time of steady lighting.

Although the alternating current at the time of the steady lighting is shown as a simple rectangle wave, this is a mere example so that it is not limited to this driving waveform. For example, frequency thereof may be lower than this steady lighting frequency, and it may have waveform in which frequencies selected from a range of 5-200 Hz are combined, or as shown in FIG. 9, waveform on which pulse etc. is superimposed may be good.

An experimental result about a range of the electric power value in an asymmetrical rectangle wave operation in the standby power lighting according to the present invention is shown in Table 2. As shown in Table 2, a lamp, whose rated lighting electric power was 180 W, was used, and an electric power value of the asymmetrical rectangle wave operation of the present invention was changed in a range of 10 W-140 W. It was examined whether the lamp was lit, whether electrode wear occurred, whether a flicker occurred, and whether there was a position gap of a projection, in each electric power value. The standard of judgment of Table 2 will be described below.

The symbol "⊚" shows that the lamp was in a condition where lighting could be performed, and that there is no flicker, no wear of an electrode tip portion, and further no position gap of a projection, so that the operation thereof was stably performed over a long time. The symbol "○" shows that the lamp was in a condition where lighting could be performed, and that there is no flicker and no wear of an electrode tip portion, but there is a position gap (position shifting) of a projection after a long time lighting operation, so that it was difficult to apply it to a lamp having a long life span, which requires illumination maintenance property over 4,000 hours. The symbol "x" shows that the lamp was not in condition where lighting could be performed, or that the lamp was in condition where lighting could be performed but the electrode was worn greatly so that it could not be normally used due to a phenomenon, such as a flicker. The above standard of judgment is applied to the following tables.

TABLE 2

| Lighting power | Steady lighting power ratio | With or without lighting | Wear of an electrode | Flicker | Position gap of a projection | Judgment |
|---|---|---|---|---|---|---|
| 10 W | 6% | X | — | — | — | X |
| 20 W | 11% | ○ | ○ | No | No | ⊚ |

TABLE 2-continued

| Lighting power | Steady lighting power ratio | With or without lighting | Wear of an electrode | Flicker | Position gap of a projection | Judgment |
|---|---|---|---|---|---|---|
| 30 W | 17% | ○ | ○ | No | No | ◎ |
| 36 W | 20% | ○ | ○ | No | No | ◎ |
| 40 W | 22% | ○ | ○ | No | No | ◎ |
| 50 W | 28% | ○ | ○ | No | No | ◎ |
| 60 W | 33% | ○ | ○ | No | No | ◎ |
| 70 W | 39% | ○ | ○ | No | Yes | ○ |
| 80 W | 44% | ○ | ○ | No | Yes | ○ |
| 90 W | 50% | ○ | ○ | No | Yes | ○ |
| 100 W | 56% | ○ | X | No | Yes | X |
| 110 W | 61% | ○ | X | No | Yes | X |
| 120 W | 67% | ○ | X | Yes | Yes | X |
| 130 W | 72% | ○ | X | Yes | Yes | X |
| 140 W | 78% | ○ | X | Yes | Yes | X |

As shown in Table 2, lighting could not be maintained in case of low electric power, which is 11% lower than the rated electric power. It is inferred that since the temperature of the electrode whose polarity is in a cathode side becomes extremely low in the driving period Ta, sufficient thermoelectronic emission could not be performed so that it became impossible to maintain electric discharge, thereby becoming glow discharge as mentioned above, whereby it was detected as unusual voltage and then the light went out or the electric discharge stopped at time of polarity reversals since a current value was small. Moreover, in case of the electric power is higher than 50% of rated power, the projection disappeared since the temperature of the electrode whose polarity is in an anode side operation, was too high for a long time, i.e., during a driving period Ta. For these reasons, only when electric power in asymmetrical rectangle wave driving for lighting, was selected from a range of 11-50% of the rated power, there was no flicker, and the good lighting state could be created without disappearance of the projection at the tip of the electrode. However, it turned out that, when the standby power lighting was performed for a long time in case of electric power between 39-50% of the rated power, that is, 70-90 W, a position gap (position shifting) of the projection occurred. Although the position gap of the projection was not a big problem as in a flicker, since it caused illumination attenuation, it was desirable that the position gap amount was as small as possible.

Although the lamp that carries out rated lighting at 180 W is shown in the above example, rated power is not limited to 180 W, and other lamps may be applied in the same manner. In this case, although it depends on the design of a lamp, even if an electrode having a size that can withstand the rated power is, designed, and even if the electric power is higher than 50% of the rated power and the second polarity period Tb is 5 ms or less (Tb≦5 ms), when a rectangle wave lighting operation in which the driving period is asymmetrical or a direct current lighting operation is performed so that the ratio of the drive periods is greater than 0.1 (Tb/Ta>0.1), as shown above, a flicker phenomenon occurred due to disappearance of the projection. On the other hand, it also turned out that in case the design of the lamp differed therefrom and in case of the rectangle wave driving in which a driving period is asymmetrical and the ratio of the drive periods is 0.1 or less (Tb/Ta≦0.1), although it was stably operated by electric power of up to approximately 20 W, electric discharge could not be maintained in case of 10 W.

Next, when the first polarity period Ta was 100 ms and the second polarity period Tb was 0.05 ms (Tb/Ta=0.0005), when the first polarity period Ta was 100 ms and the second polarity period Tb was 5 ms (Tb/Ta=0.05), and when the first polarity period Ta was 150 ms and the second polarity period Tb was 0.05 ms (Tb/Ta=0.0003), it was examined whether lighting was performed, whether wear of the electrode occurred, whether there was a flicker, and whether there was a position gap of the projection of the electrode, in each electric power value, where electric power thereof was changed in a range of 10 W-140 W. The result thereof is shown in Tables 3 through 5.

TABLE 3

Tb/Ta = 0.0005

| Lighting power | Steady lighting power ratio | With or without lighting | Wear of an electrode | Flicker | Position gap of a projection | Judgment |
|---|---|---|---|---|---|---|
| 10 W | 6% | X | — | — | — | X |
| 20 W | 11% | ○ | ○ | No | No | ◎ |
| 30 W | 17% | ○ | ○ | No | No | ◎ |
| 36 W | 20% | ○ | ○ | No | No | ◎ |
| 40 W | 22% | ○ | ○ | No | No | ◎ |
| 50 W | 28% | ○ | ○ | No | No | ◎ |
| 60 W | 33% | ○ | ○ | No | No | ◎ |
| 70 W | 39% | ○ | ○ | No | No | ◎ |
| 80 W | 44% | ○ | ○ | No | No | ◎ |
| 90 W | 50% | ○ | ○ | No | No | ◎ |
| 100 W | 56% | ○ | X | No | Yes | X |
| 110 W | 61% | ○ | X | No | Yes | X |
| 120 W | 67% | ○ | X | Yes | Yes | X |
| 130 W | 72% | ○ | X | Yes | Yes | X |
| 140 W | 78% | ○ | X | Yes | Yes | X |

TABLE 4

Tb/Ta = 0.05

| Lighting power | Steady lighting power ratio | With or without lighting | Wear of an electrode | Flicker | Position gap of a projection | Judgment |
|---|---|---|---|---|---|---|
| 10 W | 6% | X | — | — | — | X |
| 20 W | 11% | ○ | ○ | No | No | ◎ |
| 30 W | 17% | ○ | ○ | No | No | ◎ |
| 36 W | 20% | ○ | ○ | No | No | ◎ |
| 40 W | 22% | ○ | ○ | No | No | ◎ |
| 50 W | 28% | ○ | ○ | No | No | ◎ |
| 60 W | 33% | ○ | ○ | No | No | ◎ |
| 70 W | 39% | ○ | ○ | No | No | ◎ |
| 80 W | 44% | ○ | ○ | No | No | ◎ |
| 90 W | 50% | ○ | ○ | No | No | ◎ |
| 100 W | 56% | ○ | X | No | Yes | X |
| 110 W | 61% | ○ | X | No | Yes | X |
| 120 W | 67% | ○ | X | Yes | Yes | X |
| 130 W | 72% | ○ | X | Yes | Yes | X |
| 140 W | 78% | ○ | X | Yes | Yes | X |

TABLE 5

Tb/Ta = 0.0003

| Lighting power | Steady lighting power ratio | With or without lighting | Wear of an electrode | Flicker | Position gap of a projection | Judgment |
|---|---|---|---|---|---|---|
| 10 W | 6% | X | — | — | — | X |
| 20 W | 11% | ○ | ○ | No | No | ◎ |
| 30 W | 17% | ○ | ○ | No | No | ◎ |
| 36 W | 20% | ○ | ○ | No | No | ◎ |
| 40 W | 22% | ○ | ○ | No | No | ◎ |
| 50 W | 28% | ○ | ○ | No | No | ◎ |

TABLE 5-continued

Tb/Ta = 0.0003

| Lighting power | Steady lighting power ratio | With or without lighting | Wear of an electrode | Flicker | Position gap of a projection | Judgment |
|---|---|---|---|---|---|---|
| 60 W | 33% | ○ | ○ | No | No | ◎ |
| 70 W | 39% | ○ | ○ | No | No | ◎ |
| 80 W | 44% | ○ | ○ | No | No | ◎ |
| 90 W | 50% | ○ | ○ | No | Yes | ○ |
| 100 W | 56% | ○ | X | No | Yes | X |
| 110 W | 61% | ○ | X | No | Yes | X |
| 120 W | 67% | ○ | X | Yes | Yes | X |
| 130 W | 72% | ○ | X | Yes | Yes | X |
| 140 W | 78% | ○ | X | Yes | Yes | X |

As shown in Tables 3 and 4, it turned out that if a second driving period Tb was 5 ms or less (Tb≦5 ms) and Tb/Ta was in a range of 0.0005-0.05, while an operation thereof was stable, there was also no position gap of the projection and a high illuminance maintenance rate could be obtained. On the other hand, as shown in Table 5, when Tb was 5 ms or less (Tb≦5 ms) and Tb/Ta was less than 0.0005, a position gap of the projection of an electrode was confirmed at electric power of 90 W.

Next, a lamp of rated lighting power of 180 W was used, it was examined whether the lamp was lighted, whether electrode wear occurred, whether a flicker occurred, and whether there was a position gap of a projection, in each electric power value, where electric power thereof was changed in a range of 70 W-140 W in a conventional driving method, which is alternating current driving (Tb/Ta=1.0). The result thereof is shown in Table 6.

As shown in Table 6, since the temperature of the tip surface of the electrode was low at lighting electric power of 120 W or less, while arc spot was not stabilized, the electrode was worn out and the flicker was observed.

TABLE 6

| Lighting power | Steady lighting power ratio | With or without lighting | Wear of an electrode | Flicker | Judgment |
|---|---|---|---|---|---|
| 10 W | 6% | X | — | — | X |
| 20 W | 11% | X | — | — | X |
| 30 W | 17% | X | — | — | X |
| 36 W | 20% | ○ | X | Yes | X |
| 40 W | 22% | ○ | X | Yes | X |
| 50 W | 28% | ○ | X | Yes | X |
| 60 W | 33% | ○ | X | Yes | X |
| 70 W | 39% | ○ | X | Yes | X |
| 80 W | 44% | ○ | X | Yes | X |
| 90 W | 50% | ○ | X | Yes | X |
| 100 W | 56% | ○ | X | Yes | X |
| 110 W | 61% | ○ | X | Yes | X |
| 120 W | 67% | ○ | ○ | No | ◎ |
| 130 W | 72% | ○ | ○ | No | ◎ |
| 140 W | 78% | ○ | ○ | No | ◎ |

Figure 10:
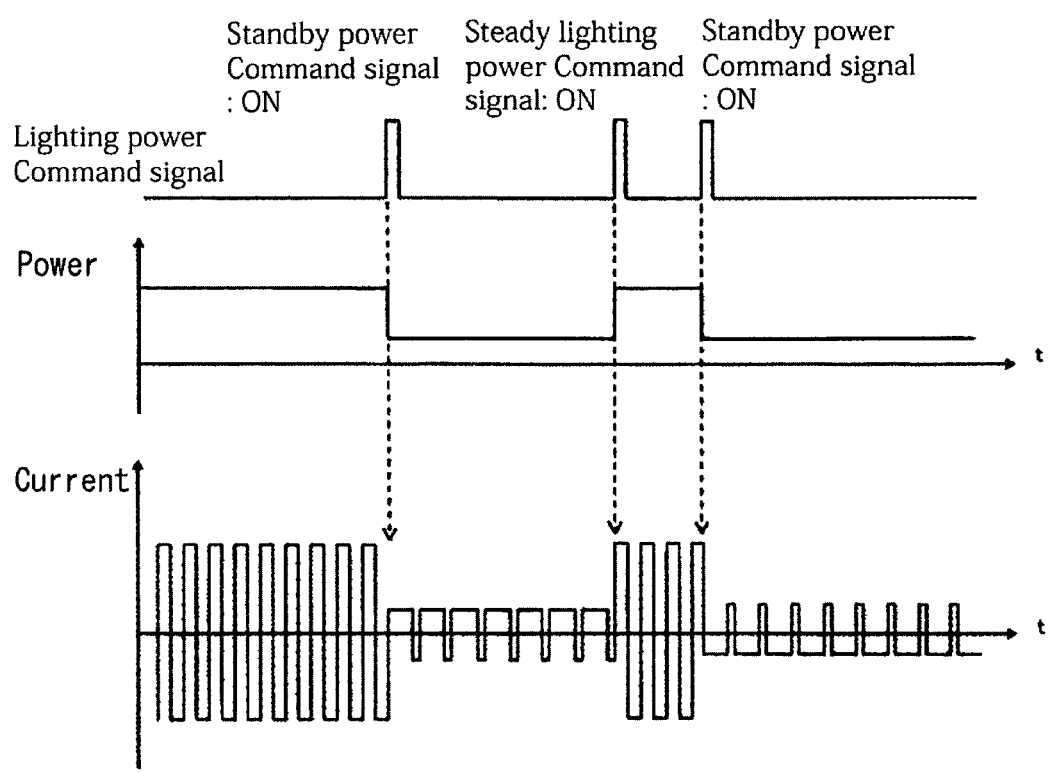
FIG. 10 is a diagram showing another example of waveform in a standby power lighting mode.

The other examples of a waveform in a standby power lighting mode are shown in FIGS. 10A and 10B. These figures show an example of a lighting electric power command signal and electric power and current waveforms, wherein a vertical axis shows a signal level, a current value, and an electric power value, and a horizontal axis shows time. In FIG. 10A, according to a standby electric power command signal, rectangle wave driving, in which the driving period thereof was asymmetrical, was performed, so that the second polarity period Tb was 5 ms or less (Tb≦5 ms) and the ratio of the driving periods Tb/Ta was 0.1 or less (Tb/Ta≦0.1) in which the period Ta and the period Tb were reversed in a predetermined time. Essentially, when a rectangle wave lighting operation in which the driving period was asymmetrical or a direct current lighting operation, was performed so that the ratio of the drive periods was greater than 0.1 (Tb/Ta>0.1), as shown above, the projection disappeared when an input thereof was originally high. Even if electric power thereof was 50% or less of the rated power, it was not true that there was not wear thereof at all so that the amount of wear was very slight. Therefore, for example, there was no problem in case of a relatively short time (for example, approximately one hour), such as time for performing standby power lighting. However, it is assumed that when it was used in a projection mode in which an image was projected on a screen, even if it was a small amount of wear, it became a problem in order to satisfy the illuminance maintenance rate exceeding 5,000 hours. It was close to a direct current driving operation especially in case where the drive period Tb was very small. As disclosed in Japanese Patent Application Publication No. 2006-332015, since there was no process in which a projection was generated, was easily imagined that that the amount of wear thereof affected the illumination characteristic greatly. In order to avoid this problem, for example, when polarity thereof was reversed in a middle of a rectangle wave lighting operation in which the drive period was asymmetrical so that the second polarity period Tb was 5 ms or less (Tb≦5 ms) and the ratio of the driving periods Tb/Ta was 0.1 or less (Tb/Ta≦0.1) (FIG. 10A) or when the polarity of the driving periods Ta and Tb was reversed every time the lighting mode was changed (FIG. 10B), by avoiding deviation of the thermal load to the electrode, the illumination life characteristic could be secured even if electric power thereof was 50% or less of electric power.

It is necessary to supply asymmetrical rectangle wave current to a lamp at time of standby power lighting, so that it is necessary to make asymmetrical the time to turn on Q1, Q4, and Q3 and Q2 by turns by giving a drive signal of an asymmetrical rectangle wave to the switching elements Q1-Q4 of the full bridge circuit 2 shown in FIG. 4.

In an actual circuit configuration, for example, a high-level gate driving signal to be inputted to the switching elements Q1 and Q2 is generated by charging a capacitor. In this case, since the above mentioned capacitor discharges, a long time is covered, it is difficult to maintain the switching elements Q1 and Q3 at ON state, and it needs to charge a capacitor periodically. When a drive circuit using such a capacitor is used, the switching elements Q1 and Q3 are temporarily turned off in a period where the capacitor is charged, so that a periodic polarity-reversal operation is performed. The period where the capacitor is charged is approximately 0.1 ms, which depends on the capacity of the capacitor. Therefore, the polarity reversal period, i.e., a drive period Tb, is desirably approximately 0.1. If a direct current lighting driving is performed, it is necessary to maintain switching elements Q1 and Q4, or Q3 and Q2 in an ON state by giving a direct current driving signal to the switching elements Q1-Q4 of the full bridge circuit 2 shown in FIG. 4. Therefore, it is necessary to give a high level signal continuously to gates G1 and G4 of the switching elements Q1 and Q4, or gates G3 and G2 of the switching elements Q3 and Q2, and in addition, it is necessary to impress, to the switching elements Q1 and Q3, high level voltage as the gate driving signal voltage, which is higher than that of the gate driving signal to the switching elements Q2 and Q4. Although the high level driving signal supplied to the gates G1 and G3 of the switching elements Q1 and Q3 may be generated by using a separate power supply or a charge pump circuit etc., the number of parts thereof increases and the cost thereof also increases. Therefore, when a rectangle wave lighting operation in which the drive period is asymmetrical is performed so that the second polarity period Tb is 5 ms or less (Tb≦5 ms) and the ratio of the driving periods is 0.1 or less (Tb/Ta≦0.1), it is possible to configure a light circuit at low cost, without specially increasing the number of parts in an actual circuit configuration.

Next, description of a case in which lighting performed by electric power of 50% or less of that in steady lighting such as standby power lighting is shifted to lighting performed by the power of the steady lighting, will be given blow. In this case, when a first polarity driving polarity period of a rectangle wave alternating current is Ta (seconds) and a second polarity driving period is Tb (seconds), it is desirable that frequency thereof and/or electric power be gradually changed from a state where the second polarity period Tb is 5 ms or less (Tb≦5 ms), and the ratio of the driving periods is 0.1 or less (Tb/Ta≦0.1). The reason therefor is explained below. A certain time is required for mercury to evaporate and for an operation to be performed at a certain pressure, thereby shifting to electric power of regular lighting. However, if in this transition period, an operation is performed by an asymmetrical rectangular wave lighting of Tb/Ta≦0.1, it can be easily imagined that, as mentioned above, in the first polarity driving period Ta, which is a relatively long driving period, a projection of an electrode which serves as an anode in such an operation disappears. From such viewpoints, in case of shifting to steady lighting, it is desirable that shifting to an alternating current driving operation be performed while the operating power becomes high gradually (see FIG. 11). When the power in the operation is increased while frequency is gradually brought close to that of a steady lighting operation after shifting to the alternating current driving operation that is an operation at time cycle of the same degree as high frequency, that is, the second polarity period Tb, and when an alternating current driving operation is performed by comparatively low electric power applied to electrodes, which serve as an anode and a cathode respectively, thereby experiencing opposite polarities, since the temperature of electrodes can be gradually raised without rapidly giving thermal load thereto, it is possible to further prevent cracks of the electrode tip sections due to heat stress etc. When electric power is gradually raised at frequency that is approximately the same as that in the first polarity period Ta, as mentioned above, it is apparent that the problem on which the projection of an electrode disappears, occurs.

In general, an electrode that is used for a high pressure discharge lamp is mainly made of tungsten, and in order to improve an illuminance life characteristic, the tungsten whose purity is extremely high, i.e., 99.999% or more, is used. Although a long life span thereof can be expected in the sense that the amount of impurities is small in the high purity tungsten, since a crystal grain becomes large, there is a drawback on which it is friable. Since especially a tip portion becomes extremely high in temperature, a crystal grain tends to become large. When thermal stress is rapidly applied thereto, a problem on which cracks occur between crystal grains, arises. Therefore, when shifting to steady lighting, it is desirable that electric power be shifted after shifting to an alternating current driving.

Figure 11:
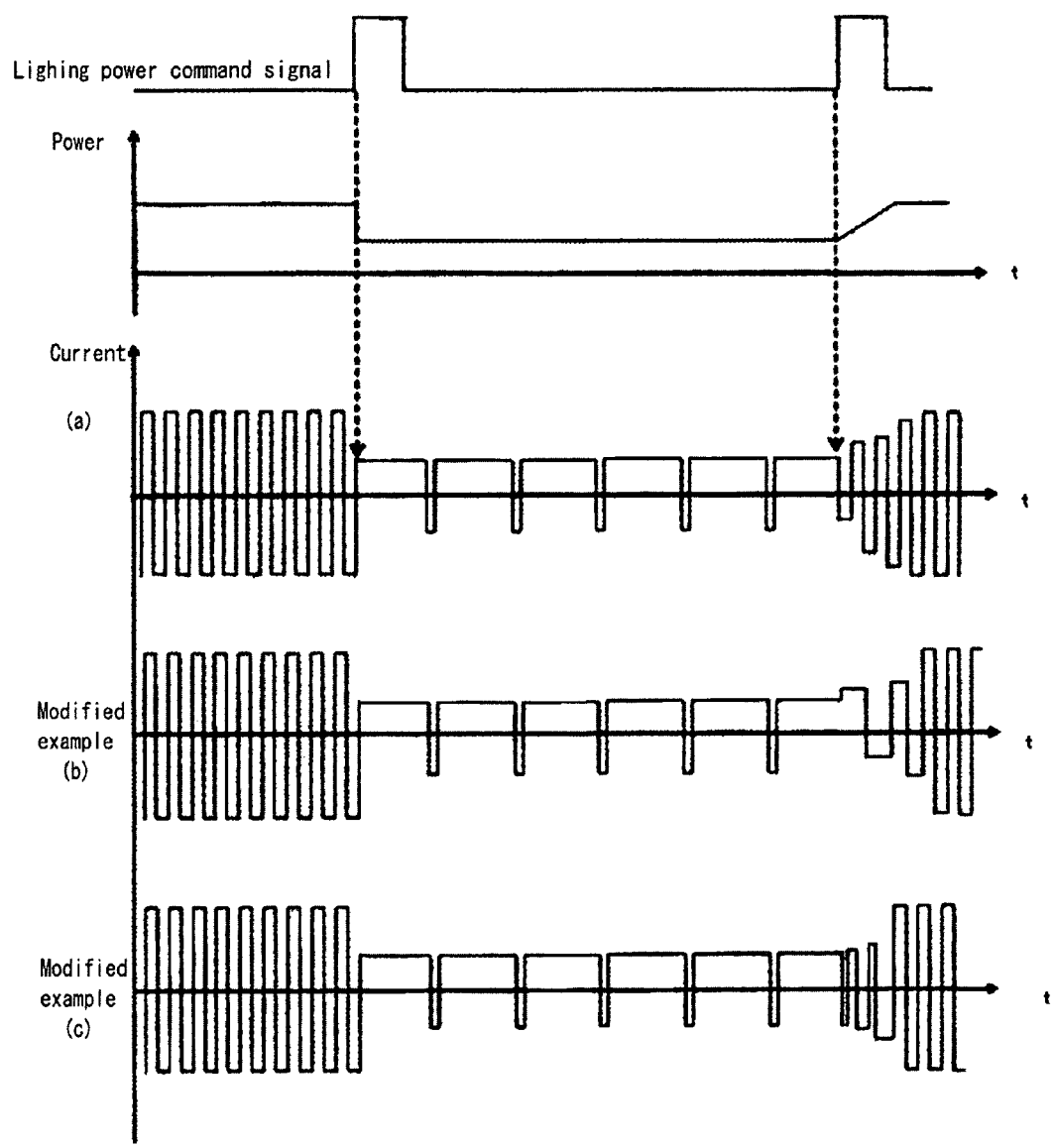
FIG. 11 is a diagram showing an example of waveform for making small a thermal load at time of shifting from standby power lighting to steady lighting.

On such a standpoint, when shifting to steady lighting, the frequency thereof is not necessarily the same frequency as the alternating current driving frequency in the rated operation. Rather, the mentioned above thermal load can be reduced to the utmost low level by changing the frequency with electric power shift. FIG. 11 is a diagram showing an example of waveform for making small a thermal load at time of shifting from standby power lighting to steady lighting. In FIG. 11, when shifting from standby power lighting to steady lighting, lighting electric power is gradually increased thereby shifting to steady lighting, and as seen in wave form (a) of FIG. 11, it is brought close to a steady lighting operation while changing time widths of a cathode operation and an anode operation in order to decrease difference of electrode temperature in a cathode operation side and that in an anode operation side. Or, as shown in a modified example wave form (b) of FIG. 11, it is brought close to a steady lighting operation while gradually increasing frequency and alternating current, or as shown in a modified example wave form (c) of FIG. 11, it is brought close to a steady lighting operation while changing time widths of a cathode operation and an anode operation in order to decrease difference of electrode temperature in a cathode operation side and that in an anode operation side.

Figure 12:
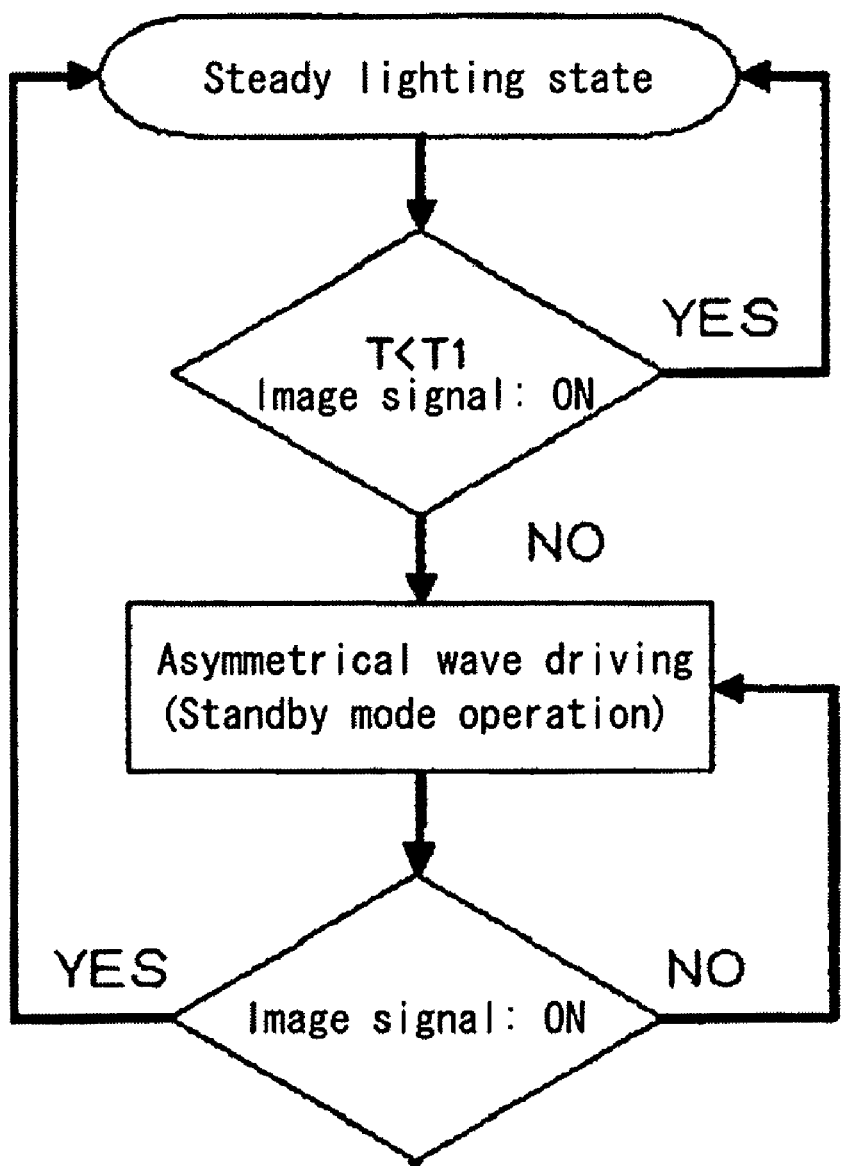
FIG. 12 is a flow chart showing an operation of an embodiment in which it is shifted to a standby power lighting mode when there is no change in an image signal, even though predetermined time elapses.
Figure 13:
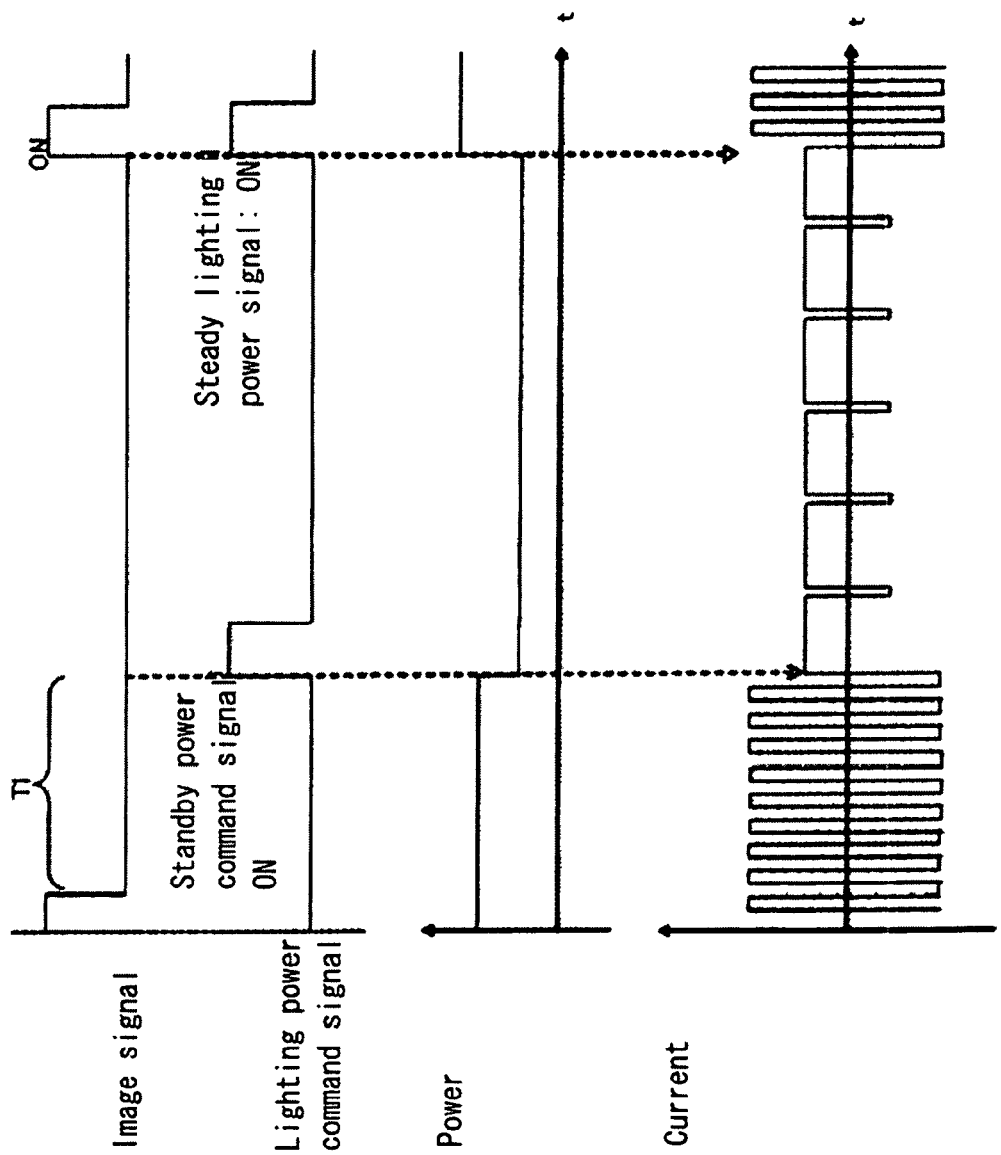
FIG. 13 is a timing chart showing lighting electric power command signal, electric power and current in an embodiment in which it is shifted to a standby power lighting mode when there is no change in an image signal, even though predetermined time elapses.

Next, description of an example of a control operation in case where the high pressure discharge lamp lighting device of this embodiment is provided in a projector shown in FIG. 5, will be given below. FIG. 12 shows an operation flow chart in case there is no change in an image signal in a period longer than a predetermined period T1 that is set in an image control unit. FIG. 13 shows a timing diagram of a lighting electric power command signal, electric power, and current in such a case. In FIGS. 12 and 13, if there is no change in an image signal for a period longer than a predetermined period T1 in steady lighting, a light control section 31b of a projector control unit 31 transmits a signal for selecting a standby power lighting mode, and a lighting apparatus 30 switches the mode to the standby power lighting mode based on this signal. And when an image signal is turned on, the standby power lighting model is switched to a steady lighting mode again.

By such control described above, for example, in a state where an image is projected on a screen face from a projector by an external signal of a personal computer etc., when a state where there is no change in the screen, continues, it is possible to switch the mode to the standby power lighting mode automatically, so that electric power thereof can be saved. Furthermore, for example, if cooling of the high pressure mercury lamp is stopped while the mode is switched to the standby power lighting mode, electric power can be further saved. Moreover, in an environment where lighting, which is short in time, is repeatedly performed, damages at start-up time sometimes affect the life span of the high pressure discharge lamp adversely. When the standby power lighting mode is used, there are advantages that a life span characteristic is substantially improved by performing a continuous lighting operation without extinguishing the high pressure discharge lamp, and that an image can be projected on a screen instantly.

Figure 14:
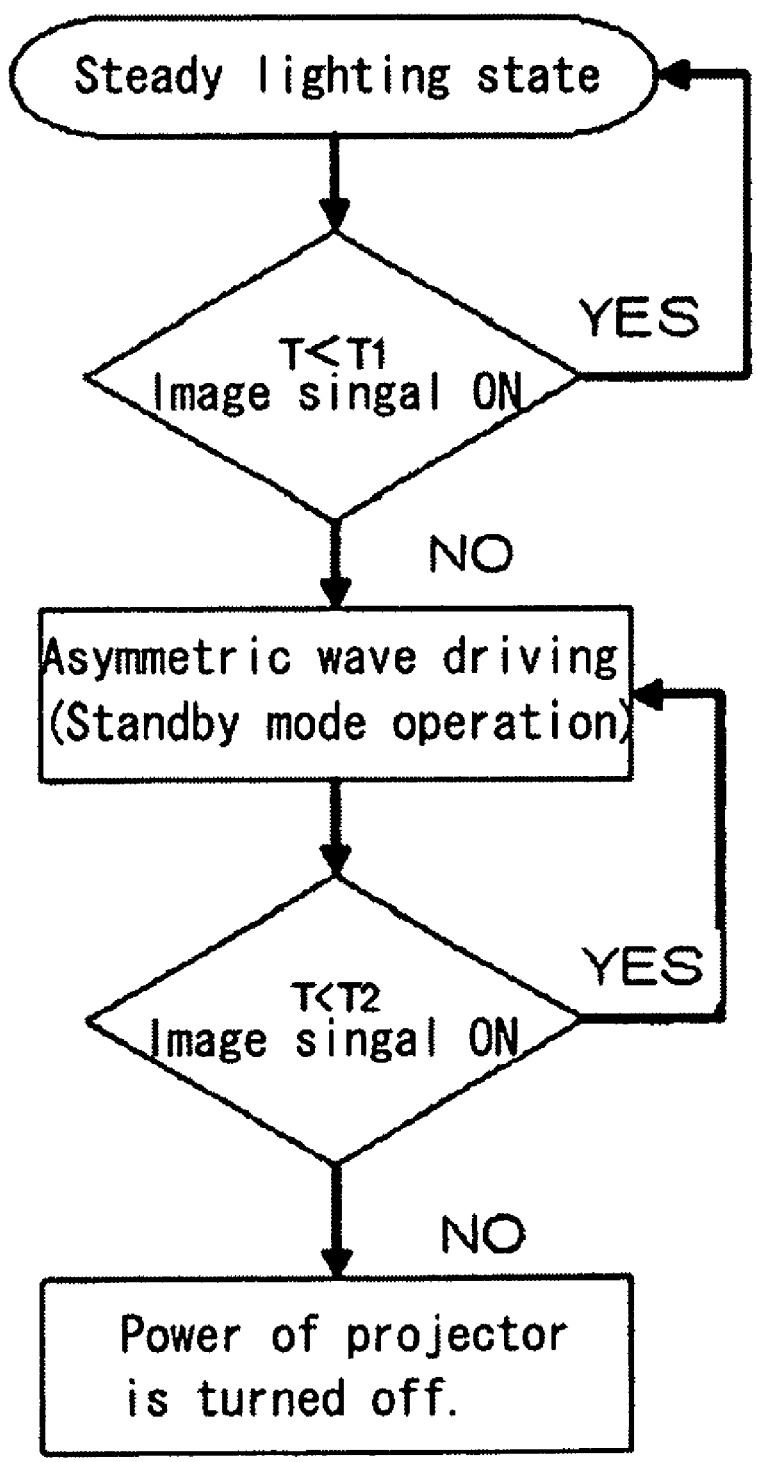
FIG. 14 a flow chart showing an operation of an embodiment wherein the lamp is turned off when a state in a standby power lighting mode continues beyond predetermined time.
Figure 15:
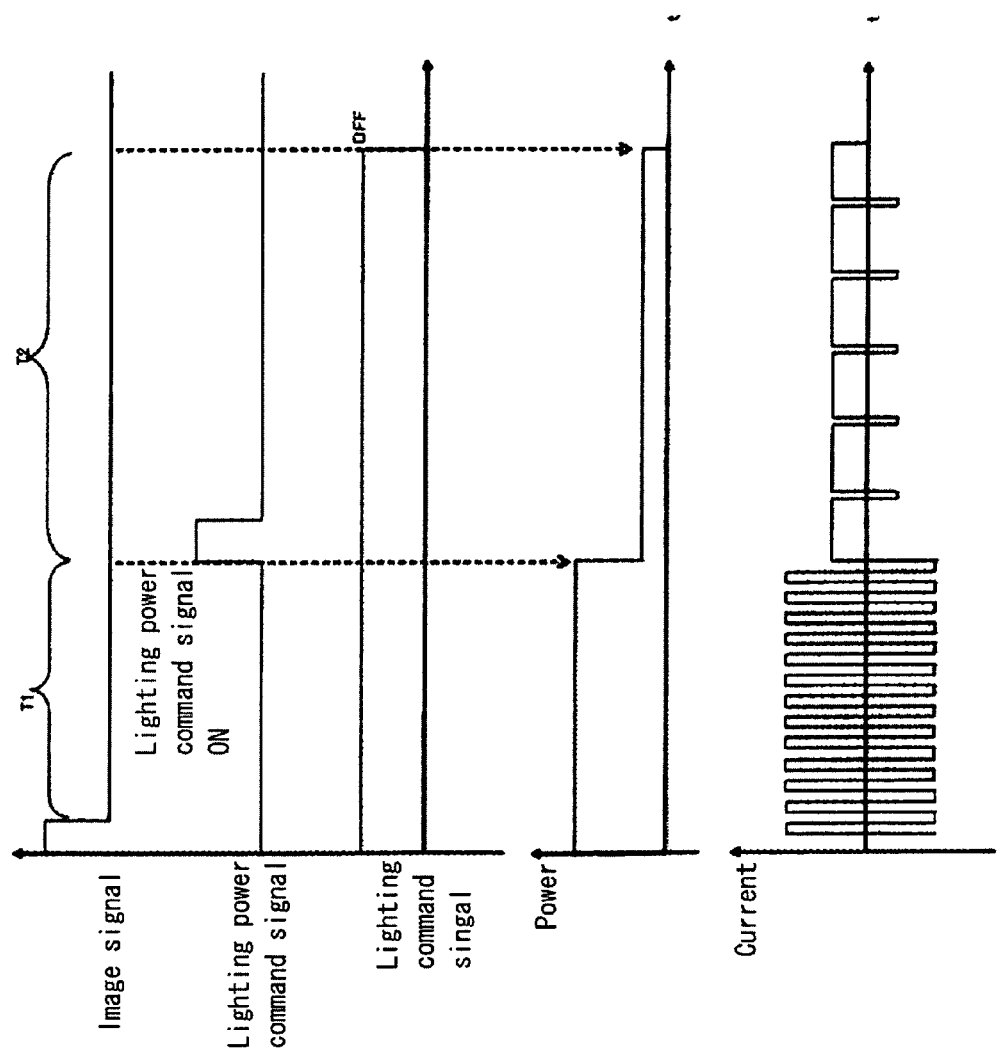
FIG. 15 is a timing chart showing lighting electric power command signal, electric power and current in an embodiment wherein the lamp is turned off when a state in a standby power lighting mode continues beyond predetermined time.

FIG. 14 shows a control flow chart in case where a standby power lighting operation continues for a period longer than predetermined period T2, which is set in advance. FIG. 15 shows a timing diagram of a lighting electric power command signal, electric power, and current in such a case. As shown in FIGS. 14 and 15, if there is no change in image signal for a period longer than a predetermined period T1 in steady lighting, the mode is switched to a standby power lighting mode by the light control section 31b of the projector control unit 31. Furthermore, when the standby power lighting continues over the predetermined period T2, the light control section 31b of the projector control unit 31 transmits a signal for turning off the high pressure discharge lamp. By this function, when the projector is stopped being used while the standby lighting operation continues, it is possible to prevent failure to turn off the projector. That is, in case of the standby lighting operation, the lighting electric power is low, and a liquid crystal display of an image display unit is turned off as to a polarization direction, so that it looks as if it was turned off. Specifically, in case of use in which a projector is not installed at hand, that is, it is hung from the ceiling (a ceiling hanging use), such a situation is possible.

Figure 16:
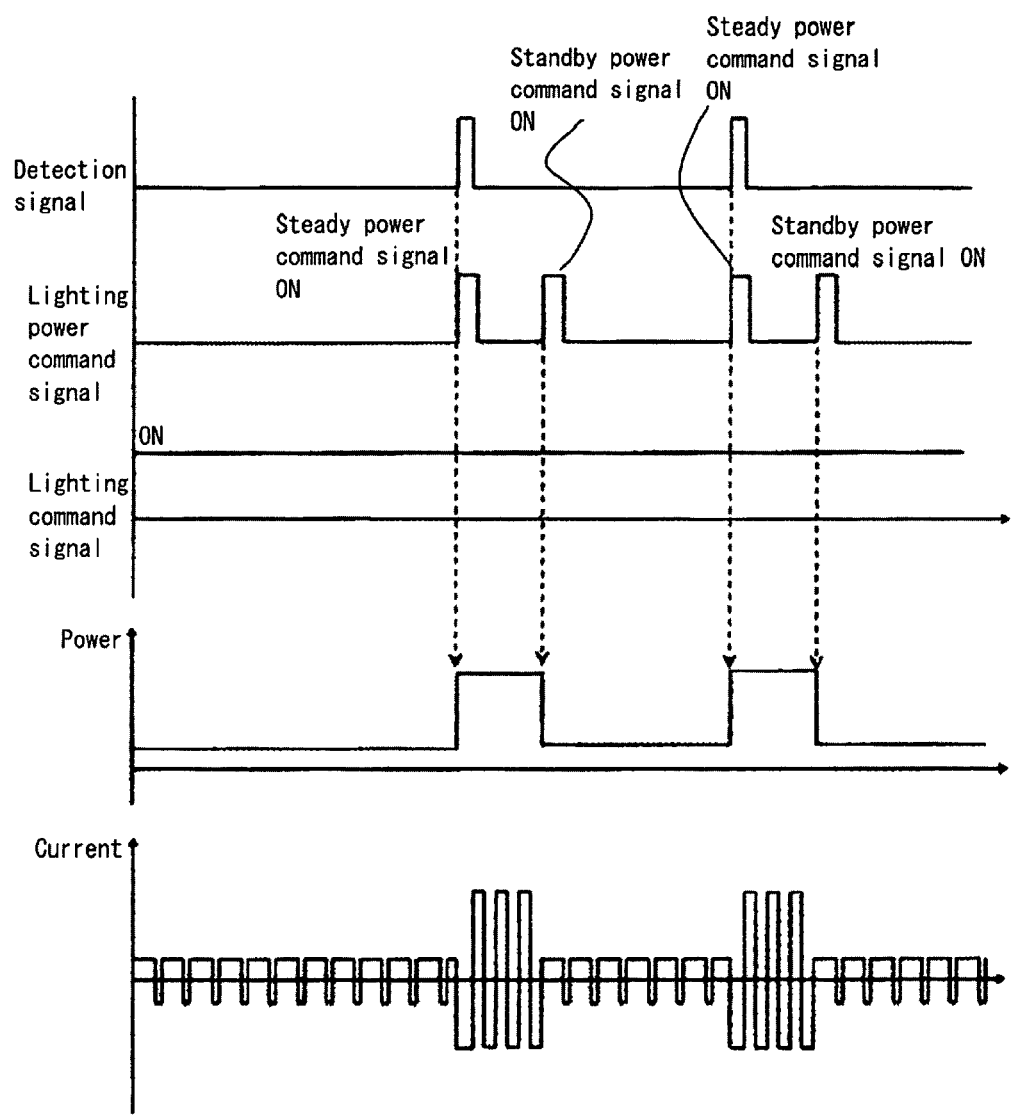
FIG. 16 is a timing chart showing lighting electric power command signal, electric power and current in an embodiment wherein a standby lighting mode is changed to a steady lighting mode in conjunction with a detecting unit.
Figure 17:
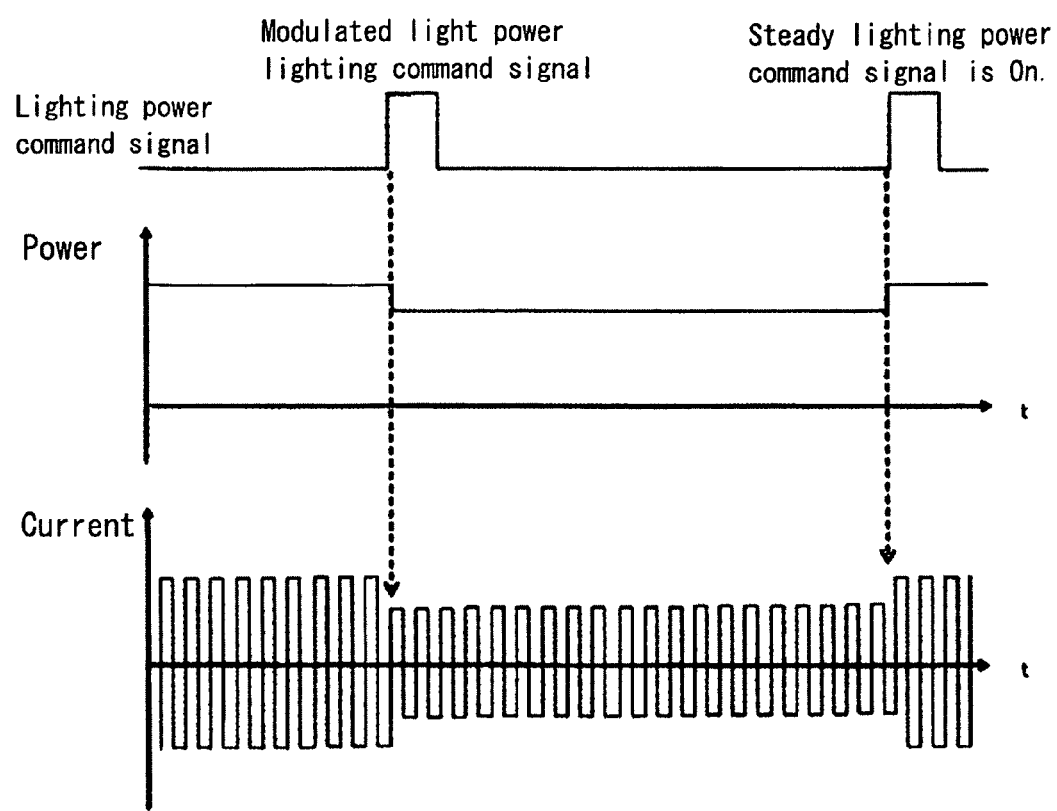
FIG. 17 is a diagram showing an example of waveform of current which flows through a discharge lamp of the prior art.

FIG. 16 shows a timing diagram of a detection signal, a lighting electric power command signal, electric power, and current. As shown in FIG. 16, while standby lighting is performed, when a detection signal is turned on, a lighting command signal is turned on working therewith, so that it is switched to steady lighting, and after the steady lighting operation is performed for a predetermined period, it is switched to standby lighting again. When a detection signal is turned on, a signal is transmitted in order to switch the mode to a steady lighting mode, from the light control section 31b of the projector control unit 31, and after it continues for a predetermined period, a standby power mode (signal) is transmitted from the light control section 31b of the projector control unit 31. By this function, it is possible to display an image on a screen only when a person passes by an infrared sensor etc., and further it is possible to save electric power compared with that in case where an image is always displayed on the screen.

Although it is mainly described that in the standby power lighting, an image is not projected on the screen, it is not limited thereto. That is, in a projection mode, in order to project a dark image more darkly on a screen, it is remarkably effective if it is operated by electric power, which is 50% or less of rated lighting electric power. In addition, the so-called improvement effects of a contrast ratio can be also expected.

The improvement of the contrast ratio mentioned above may be regarded as another effect of the standby power lighting. When a contrast ratio is high, an image can be so sharply expressed, so that it is an important performance of a projector together with the screen illuminance. For example, when a liquid crystal element is used as an image display unit, although depending on the performance of the liquid crystal element, a contrast ratio thereof is approximately 500:1 in general. Thus, the ratio of the illuminance of the screen face in case of projecting a white screen image to the illuminance of a screen face in case of projecting a black screen image, is expressed as "500:1". For example, at time of black screen image projection, when the standby power lighting is operated by electric power which is 25% of the rated lighting, it becomes possible to substantially attain the contrast ratio of 2000:1. As mentioned above, actually since the light intensity decreases more than the power ratio as the working pressure thereof decreases due to non-evaporated mercury, it is possible to realize the contrast ratio exceeding 2000:1.

Although in the above embodiment, the example of a liquid crystal element is shown as an image display unit, a DLP (digital light processor), which uses a DMD (digital mirror device) may be used. In general, a contrast ratio can be increased compared with a projector that uses the liquid crystal element in case of a DLP projector. Further, it becomes possible to improve the contrast ratio further by combining it with the present invention.

The preceding description has been presented only to illustrate and describe exemplary embodiments of the present high pressure discharge lamp lighting apparatus and a projector using the same. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A high pressure discharge lamp lighting apparatus comprising:
   a high pressure discharge lamp comprising:
      an electric discharge silica glass container enclosing 0.2 mg/mm$^3$ or more of mercury, halogen in a range of $10^{-6}$ μmol/mm$^3$ to $10^{-2}$ μmol/mm$^3$, and a predetermined amount of rare gas, and a pair of electrodes arranged in the electric discharge silica glass container to face each other at an interval of 2 mm or less; and
   a power supply apparatus that supplies a rectangle wave alternating current to the high pressure discharge lamp for lighting;
   wherein when the lamp is operated by electric power of 0.5×P (W) or less, when maximum operation power P (W) in a steady lighting state except an initial lighting period that is immediately after starting, where a first polarity driving period of a rectangle wave alternating current is Ta (seconds) and a second polarity driving period is Tb (seconds), an operation is performed so that the second polarity driving period Tb is 5 ms or less (Tb≦5 ms) and a ratio Tb/Ta of these two driving periods is 0.1 or less (Tb/Ta≦0.1).

2. The apparatus according to claim 1,
   wherein the second polarity period Tb is larger than 0.05 ms and smaller than 5 ms (0.05 ms≦Tb≦5 ms), and the ratio of the driving periods Tb/Ta is larger than 0.0005 and smaller than 0.05 (0.0005≦Tb/Ta≦0.05).

3. The apparatus according to claim 1 or 2,
   wherein after the operation is performed by electric power of 0.5×P (W) or less, when an operation is performed by electric power which is higher than 0.5×P (W), the operation is switched to a steady state lighting operation from a state where the second polarity period Tb is 5 ms or less (Tb≦5 ms) and the ratio of the driving periods is 0.1 or less (Tb/Ta≦0.1), while changing frequency thereof and/or electric power.

4. A projector for projecting an image comprising:
   a high pressure discharge lamp lighting apparatus comprising:
   a high pressure discharge lamp comprising:
      an electric discharge silica glass container enclosing 0.2 mg/mm$^3$ or more of mercury, halogen in a range of $10^{-6}$ μmol/mm$^3$ to $10^{-2}$ μmol/mm$^3$, and a predetermined amount of rare gas,
      and a pair of electrodes arranged in the electric discharge silica glass container to face each other at an interval of 2 mm or less; and
   a power supply apparatus that supplies a rectangle wave alternating current to the high pressure discharge lamp for lighting,
   wherein when the lamp is operated by electric power of 0.5×P (W) or less, when maximum operation power P (W) in a steady lighting state except an initial lighting period that is immediately after starting, where a first polarity driving period of a rectangle wave alternating current is Ta (seconds) and a second polarity driving period is Tb (seconds), an operation is performed so that the second polarity driving period Tb is 5 ms or less (Tb≦5 ms) and a ratio Tb/Ta of these two driving periods is 0.1 or less (Tb/Ta≦0.1).

5. The projector according to claim 4,
wherein the second polarity period Tb is larger than 0.05 ms and smaller than 5 ms (0.05 ms≦Tb≦5 ms), and the ratio of the driving periods Tb/Ta is larger than 0.0005 and smaller than 0.05 (0.0005≦Tb/Ta≦0.05).

6. The projector according to claim 5,
wherein after the operation is performed by electric power of 0.5×P (W) or less, when an operation is performed by electric power which is higher than 0.5×P (W), the operation is switched to a steady state lighting operation from a state where the second polarity period Tb is 5 ms or less (Tb≦5 ms) and the ratio of the driving periods is 0.1 or less (Tb/Ta≦0.1), while changing frequency thereof and/or electric power.

7. The projector according to claim 4,
wherein after the operation is performed by electric power of 0.5×P (W) or less, when an operation is performed by electric power which is higher than 0.5×P (W), the operation is switched to a steady state lighting operation from a state where the second polarity period Tb is 5 ms or less (Tb≦5 ms) and the ratio of the driving periods is 0.1 or less (Tb/Ta≦0.1), while changing frequency thereof and/or electric power.

8. The projector according to any one of claims 4-6, wherein when there is no change in an image signal of the projector for a predetermined period while the discharge lamp is lighted by electric power which is higher than 0.5×P (W), an electric power mode is switched to an electric power mode of 0.5×P (W) or lower.

9. The projector according to any one of claims 4-6, wherein when there is no change in an image signal of the projector for a predetermined period while the discharge lamp is lighted on electric power of 0.5×P (W) or less, the high pressure discharge lamp is automatically turned off.

10. The projector according to any one of claims 4-6, wherein while the discharge lamp is lighted by electric power of 0.5×P (W) or less, the high pressure discharge lamp is automatically turned on in conjunction with a detecting unit.

* * * * *